(12) United States Patent
Yamaguchi et al.

(10) Patent No.: US 7,420,609 B2
(45) Date of Patent: Sep. 2, 2008

(54) IMAGE PICK-UP LENS, IMAGE PICK-UP UNIT, AND MOBILE TERMINAL PROVIDED WITH THIS IMAGE PICK-UP UNIT

(75) Inventors: Susumu Yamaguchi, Hachioji (JP); Eigo Sano, Hino (JP)

(73) Assignee: Konica Minolta Opto, Inc., Hachioji (JP)

( * ) Notice: Subject to any disclaimer, the term of this patent is extended or adjusted under 35 U.S.C. 154(b) by 754 days.

(21) Appl. No.: 10/883,216

(22) Filed: Jul. 1, 2004

(65) Prior Publication Data

US 2005/0007481 A1    Jan. 13, 2005

(30) Foreign Application Priority Data

Jul. 11, 2003  (JP) ............................... 2003-195860
Jan. 28, 2004  (JP) ............................... 2004-019883

(51) Int. Cl.
*G02B 13/16*  (2006.01)
*G02B 9/12*   (2006.01)

(52) U.S. Cl. ....................... 348/335; 359/791
(58) Field of Classification Search ................ 359/791
See application file for complete search history.

(56) References Cited

U.S. PATENT DOCUMENTS

| | | | |
|---|---|---|---|
| 5,677,798 A | 10/1997 | Hirano et al. | |
| 6,466,377 B1 | 10/2002 | Saito et al. | |
| 6,844,989 B1 | 1/2005 | Jo et al. | |
| 6,927,927 B2 * | 8/2005 | Isono | 359/793 |
| 6,930,841 B2 * | 8/2005 | Sato | 359/784 |
| 7,006,305 B2 * | 2/2006 | Amanai | 359/791 |
| 7,031,079 B2 * | 4/2006 | Isono | 359/791 |
| 2003/0058546 A1 | 3/2003 | Sato | |
| 2004/0021957 A1 * | 2/2004 | Isono | 359/791 |
| 2004/0090685 A1 | 5/2004 | Chen | |

FOREIGN PATENT DOCUMENTS

| | | |
|---|---|---|
| EP | 1 271 216 A2 | 1/2003 |
| JP | 2001-075006 | 3/2001 |

* cited by examiner

*Primary Examiner*—Lin Ye
*Assistant Examiner*—Dillon Durnford-Geszvain
(74) *Attorney, Agent, or Firm*—Cohen Pontani Lieberman & Pavane LLP

(57) ABSTRACT

An image pickup lens includes in order from an object side of the image pickup lens: a first lens having positive refractive power whose convex surface faces the object side of the image pickup lens; an aperture stop; a meniscus shaped second lens having positive refractive power whose convex surface faces an image side of the image pickup lens; and a third lens having negative refractive power whose concave surface faces the image side of the image pickup lens, wherein the image pickup lens satisfies the following conditional expressions:

$$0.8 < f1/f < 2.0 \quad (1)$$

$$20 < ((\nu 1 + \nu 2)/2) - \nu 3 < 70 \quad (2)$$

where f1 is a focal length of the first lens, f is a focal length of a total system of the image pickup lens, and $\nu 1$, $\nu 2$ and $\nu 3$ are the Abbe constants of the first to third lenses respectively.

17 Claims, 14 Drawing Sheets

FIG. 3 (b)
FIG. 3 (a)
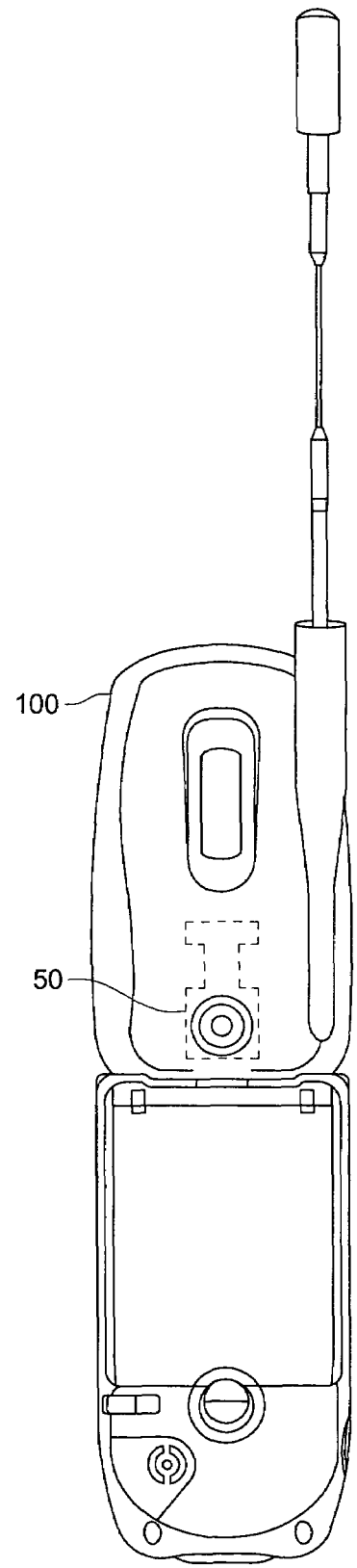
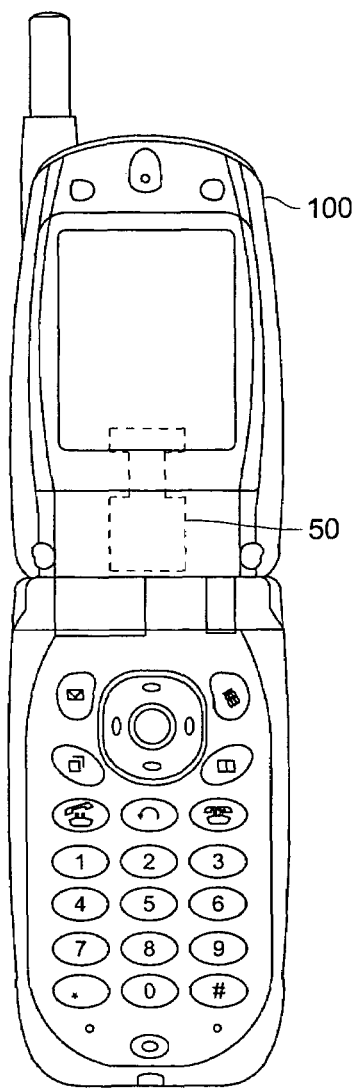

FIG. 6(a)
F2.88
— d LINE
--- g LINE
SPHERICAL ABERRATION
FIG. 6(b)
Y = 2.30
— S
--- M
ASTIGMATISM
FIG. 6(c)
Y = 2.30
DISTORTION ABERRATION
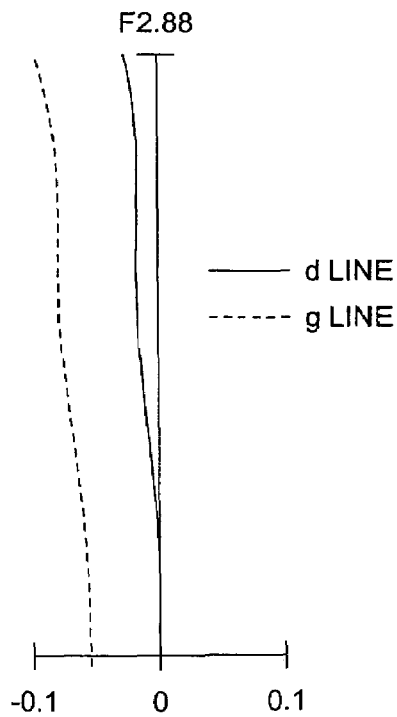
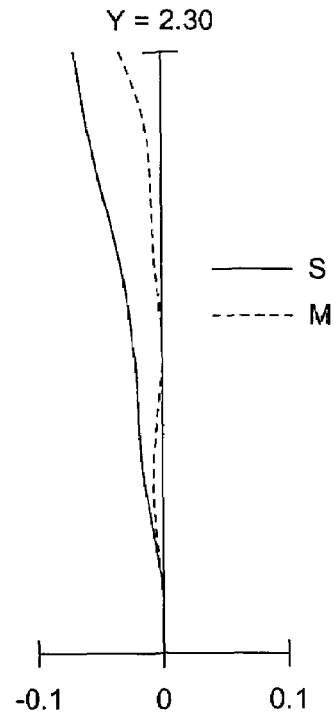
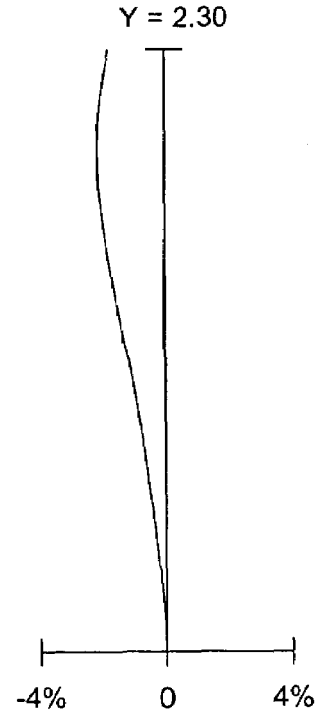
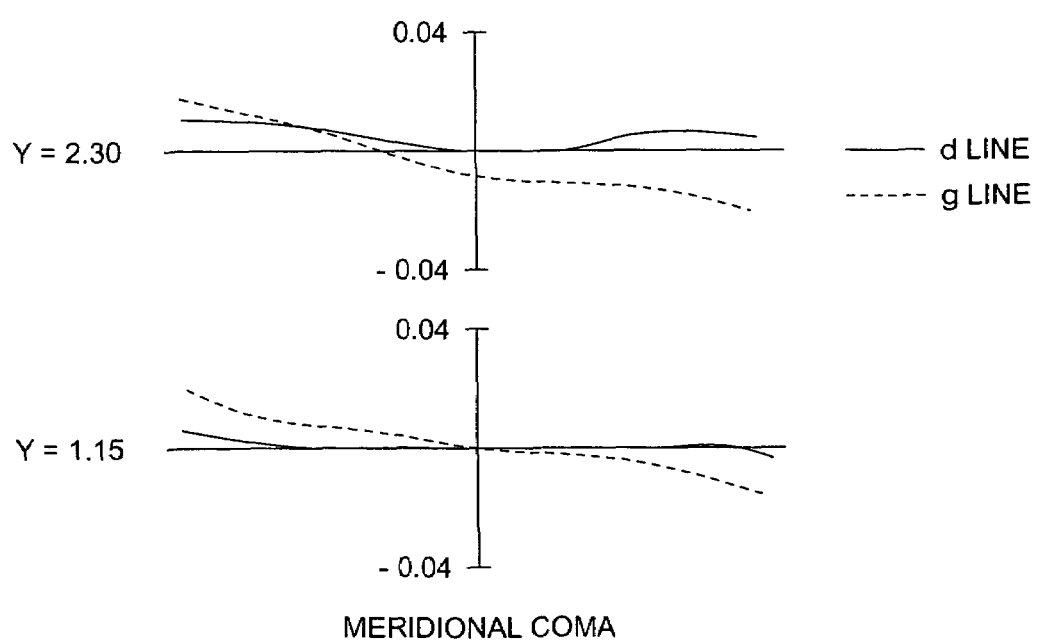
MERIDIONAL COMA

SPHERICAL ABERRATION

ASTIGMATISM

DISTORTION ABERRATION

MERIDIONAL COMA

SPHERICAL ABERRATION

ASTIGMATISM

DISTORTION ABERRATION

MERIDIONAL COMA

SPHERICAL ABERRATION

ASTIGMATISM

DISTORTION ABERRATION

MERIDIONAL COMA

SPHERICAL ABERRATION

ASTIGMATISM

DISTORTION ABERRATION

MERIDIONAL COMA

IMAGE PICK-UP LENS, IMAGE PICK-UP UNIT, AND MOBILE TERMINAL PROVIDED WITH THIS IMAGE PICK-UP UNIT

BACKGROUND OF THE INVENTION

The present invention relates to an image pick-up lens which is preferable as an optical system of a solid-state imaging element such as a CCD type image sensor or a CMOS type image sensor, an image pick-up unit having the image pick-up lens, and a mobile terminal provided with this image pick-up unit.

Recently, following the technical advantages-offering, and size reduction of an image pick-up device using the solid-state imaging element such as CCD (Charged Coupled Device)type image sensor or CMOS (Complementary Metal Oxide Semiconductor)type image sensor, a cell phone or a personal computer, provided with the image pick-up device, is spreading.

Then, following an increase of the high density by the size reduction of these cell phone or personal computer, or an increase of functions, a request for more size reduction of the image pick-up lens mounted on the image pick-up device is emphasized to intend the size reduction of these image pick-up devices.

As such an image pick-up lens for a small size image pick-up device, an image pick-up lens of 3-lens composition in which, in an order from the object side, the first lens having the positive refractive power, the second lens having the negative refractive power, and the third lens having the positive refractive power are arranged, recently becomes common, from the reason why technical advantages can be more easily offered than one or 2-lens composition image pick-up lens. Such an image pick-up lens, so-called a triplet type image pick-up lens, is disclosed in the patent document 1.

[Patent Document 1]

Tokkai No. 2001-75006.

However, although an image pick-up lens of a type which is written in Patent Document 1, is a type in which a wide image angle is secured and aberrations are finely corrected, on the one hand, it is not suitable for a size reduction of the whole length of the image pick-up lens (a distance from the most object side surface of the whole image pick-up lens system to the image side focal point).

SUMMARY

In view of such a problem, the present invention provides a 3-lens composition image pick-up lens, image pick-up unit, and mobile terminal, in which, while it is a smaller type than a conventional type, aberrations are finely corrected.

Herein, in the present invention, relating to a scale for the small type image pick-up lens, a size reduction of a level to satisfy a following conditional expression, is aimed. When this range is satisfied, the whole length of the lens can be reduced, and geometrically the outer diameter of the lens can also be reduced. Thereby, the size and weight reduction of the whole image pick-up device become possible.

$$L/2Y<1.50 \tag{7}$$

Where, L: a distance on the optical axis from the object side surface of the first lens to the image side focal point of the whole image pick-up lens system, 2Y: a length of a diagonal line of the image pick-up surface of the solid-state imaging element (a diagonal line length of the rectangle effective pixel area of the solid-state imaging element).

Herein, an image side focal point means an image point when a parallel ray of light parallel to the optical axis is incident on the lens. Furthermore, when, between the most image side surface of the image pick-up lens and the image side focal position, an optical low-pass filter, infrared ray cut-filter, or a parallel plate such as a seal-glass of a solid-state imaging element package are arranged, a value of the above L is calculated when the parallel plate part is made as an air-conversion distance.

Further, more preferably, it is a range of the conditional expression of the following (8).

$$L/2Y<1.30 \tag{8}$$

A structure written in item 1 is an image pick-up lens which consists of, in order from the object side, the first lens having the positive refractive power, and a convex surface is faced to the object side, an aperture stop, the meniscus-shaped second lens having the positive refractive power, and a convex surface is faced to the image side, and the third lens having the negative refractive power, and a concave surface is faced to the image side, and a structure in which, when a focal length of the first lens is f1, the focal length of the whole image pick-up lens system is f, and Abbe's number of the first lens v1, Abbe's number of the second lens v2, and Abbe's number of the third lens v3, the conditional expressions of the following (1) and (2) are satisfied, is applied.

$$0.8<f1/f<2.0 \tag{1}$$

$$20<\{(v1+v2)/2\}-v3<70 \tag{2}$$

According to the structure written in item 1, because it is a so-called telephoto type lens construction in which, in order from the object side, the positive lens group composed of the first lens and the second lens and the third lens in which the concave surface is faced to the image side, are arranged, it is advantageous for the size reduction of the whole length, and the aberration can be finely corrected.

That is, for the aberration correction, because the positive refractive power is allotted by the first lens and the second lens, the generation of the spherical aberration or coma can be suppressed. Further, the aperture stop is arranged between the first lens and the second lens, and because the first lens has the shape in which the convex surface is faced to the object side, and the second lens has a meniscus shape in which the convex surface is faced to the image side, it is the structure in which the lateral chromatic aberration or distortion aberration is easily corrected.

Herein, the conditional expression (1) is an expression which regulates the refractive power of the first lens. When it is less than the upper limit value in the expression (1), the positive refractive power of the first lens can be appropriately maintained, and the size of the whole length of the image pick-up lens can be reduced. On the one hand, when it is upper than the lower limit value, the refractive power of the first lens is not too large than the necessary one, and the higher order spherical aberration or coma, which generates in the first lens, can be suppressed small. Further, more preferably, a value of f1/f of the conditional expression (1) is within a range of the conditional expression of the following (9).

$$0.8<f1/f<1.65 \tag{9}$$

Further, the conditional expression (2) is a condition which finely corrects the chromatic aberration of the whole image pick-up lens system. When it exceeds the lower limit in the expression (2), the axial chromatic aberration, lateral chromatic aberration can be corrected with a well balance. Furthermore, when it is lower than the upper limit value in the expression (2), lens materials which are actually not suitable can be excluded. Further, more preferably, a value of the conditional expression (2) is within a range of the conditional expression of the following (10).

$$25<\{(v1+v2)/2\}-v3<70 \tag{10}$$

Further, because the lens composition as described above is a composition which can secure a slightly large eccentricity allowance of each lens, for example, at the time of mass production, even when the optical axis of each lens is assembled in with a minute amount deviation from the same straight line, there is also the effect that the image deterioration hardly generates, and the lens performance can be appropriately maintained.

BRIEF DESCRIPTION OF THE DRAWINGS

FIG. 3(a) shows a front view of a cell phone to which the image pick-up unit is applied, and FIG. 3(b) shows a back view of the cell phone to which the image pick-up unit is applied.

FIGS. 6(a), 6(b) and 6(c) are aberration views (spherical aberration, astigmatism, distortion aberration, meridional coma) of example 1.

DETAILED DESCRIPTION OF THE EMBODIMENT

Figure 1:
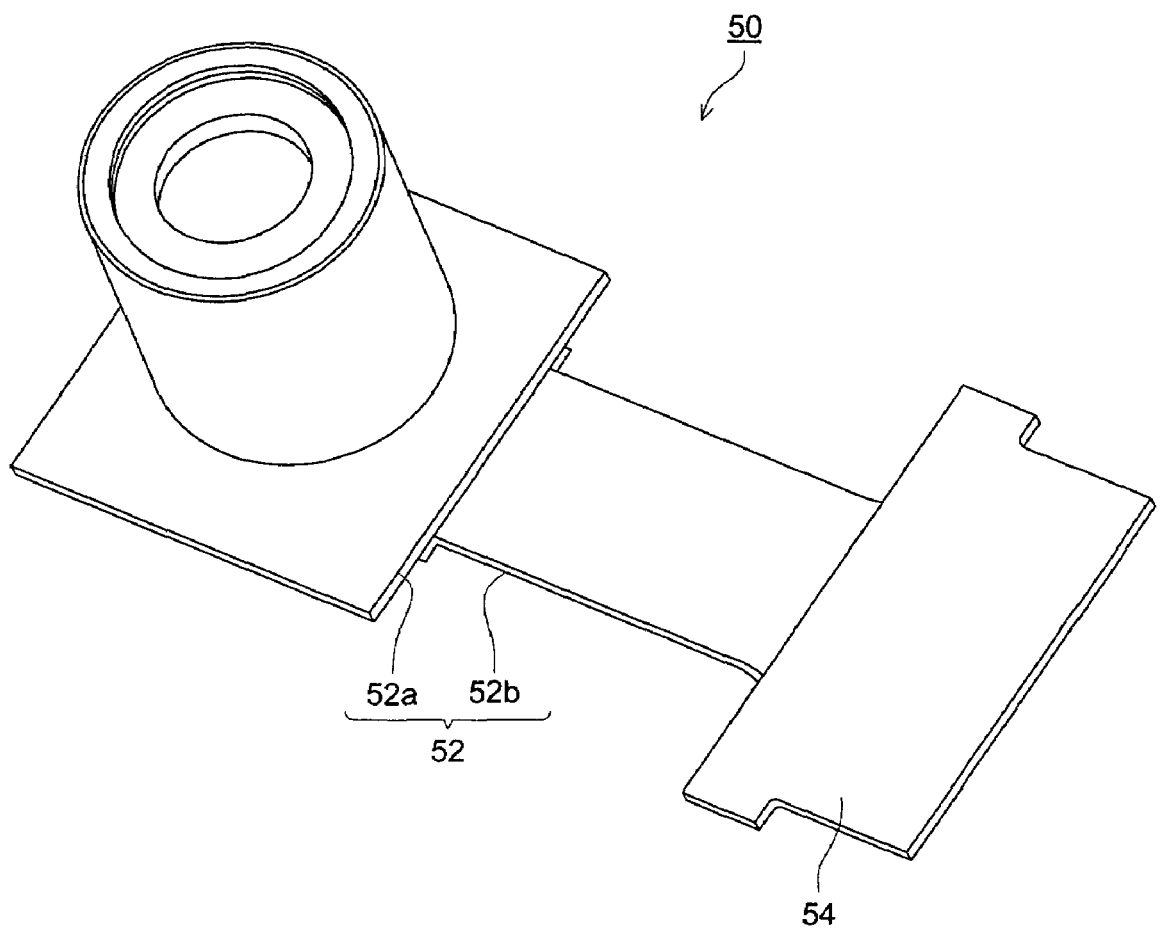
FIG. 1 is a perspective view of an image pick-up unit which is an embodiment of the present invention.

Preferable structures of the present invention will be described below.

A structure written in item 2 has the same structure as an image pick-up lens written in item 1, and when a focal length of the third lens is f3, the structure in which the conditional expression of the following (3) is satisfied, is applied.

$$-1.5<f3/f<-0.5 \tag{3}$$

According to a structure written in item 2, the conditional expression (3) regulates the refractive power of the third lens. When it exceeds the lower limit value in the expression (3), the negative refractive power of the third lens can be adequately maintained, and the size reduction of the whole length of the lens and the correction of the off-axis aberrations such as curvature of field or distortion aberration, can be finely conducted. On the one hand, when it is lower than the upper limit value, the negative refractive power of the third lens is not too larger than the necessary one, and there is no case where a light flux image-formed on a peripheral portion of the image pick-up plane of a solid-state imaging element is too much leaped up, and a securement of the telecentric characteristic of the image side light flux can be made easy.

Herein, the image side telecentric characteristic means that, after a chief ray of light of the light flux image-formed on the image pick-up surface of the solid-state imaging element is projected from the lens final surface, it becomes almost parallel to the optical axis, in other words, the exit pupil position of the image pick-up lens is fully separated from the image surface. When the telecentric characteristic becomes poor, the light flux is incident on the solid-state imaging element from a slant direction, and a shading phenomenon by which, in the peripheral portion of the image pick-up surface, a practical aperture efficiency is decreased, is generated, and the peripheral light amount becomes insufficient. Accordingly, the image side telecentric characteristic is a necessary characteristic for an image pick-up lens using the solid-state imaging element.

A structure written in item 3 has the same structure as an image pick-up lens written in item 1 or 2, and when a curvature radius of the image side surface of the second lens is R4, the structure in which the conditional expression of the following (11) is satisfied, is applied.

$$0.15<|R4|/f<0.40 \tag{11}$$

According to a structure written in item 3, the conditional expression (11) properly regulates an absolute value of the curvature radius of an image side surface of the second lens. When it exceeds the lower limit value in the expression (11), the refractive power of the image side surface of the second lens is not too larger than the necessary one, and coma flare of the off-axis light fluxes and barrel distortion are suppressed. Furthermore, in view of the lens processing, the expression is also preferable because the curvature of the second surface is not too small. On the one hand, when it is lower than the upper limit value, the refractive power of the curvature radius of the image side surface of the second lens can be adequately maintained, and the various off-axial aberrations generated in the third lens with negative power can be corrected with a well-balance. Moreover, a securement of the telecentric characteristic of the image side light flux can be made easy. It is more preferable, when the following conditional expression is satisfied.

$$0.18<|R4|/f<0.30 \tag{12}$$

A structure written in item 4 is provided with the same structure as the image pick-up lens written in item 1, and a structure in which the first lens is a meniscus shape in which the convex surface is faced to the object side, is applied.

According to the structure written in item 4, the shape of the first lens and the second lens is a symmetrical shape with an aperture stop between them, and the spherical aberration or coma generated in the first lens can be more finely corrected.

Further, it becomes the structure by which the lateral chromatic aberration or distortion aberration of the whole image pick-up lens system can be more easily corrected.

A structure written in item 5 is provided with the same structure as item 1, and a structure in which the third lens is a meniscus shape in which the concave surface is faced to the image side, is applied.

According to the structure written in item 5, because the third lens is a meniscus shape in which the concave surface is faced to the image side, the main point position of the third lens can be moved to the image side, and while the lens whole length of the whole image pick-up lens system is reduced, a sufficient back-focus can be secured.

Further, because an air lens between the second lens and the third lens is both concave shape, by its positive refractive power, the securement of the telecentric characteristic of the light flux image-formed on the image pick-up surface peripheral portion of the solid-state imaging element can be made easy.

A structure written in item 6 is provided with the same structure as any one of items 1-5, and the image side surface of the third lens has a structure in which, when the apex of the image side surface is an origin, the X axis is defined in the optical axis direction, the height along the direction perpendicular to the optical axis is h, i-order aspherical coefficient of the image side surface of the third lens is Ai, radius of curvature of the image side surface of the third lens is R6, and conic constant of the image side surface of the third lens is K6, the aspherical surface displacement X expressed by the following expression (5) and the displacement of rotational quadric surface component X0 of the aspherical surface expressed by the following expression (6) satisfy the conditional expression of the following (4) in a range of height h in the arbitrary optical axis perpendicular direction which becomes hmax× 0.7<h<hmax, to the maximum effective radius hmax.

$$X - X0 < 0 \quad (4)$$

$$X = \frac{\frac{h^2}{R6}}{1 + \sqrt{1 - (1+K6)h^2/R6^2}} + \sum A_i h^i \quad (5)$$

$$X0 = \frac{\frac{h^2}{R6}}{1 + \sqrt{1 - (1+K6)h^2/R6^2}} \quad (6)$$

Herein, an apex of the image side surface of the third lens is defined as an intersection of the image side surface and the optical axis.

According to the structure written in item 6, when it is made an aspheric shape which satisfies the conditional expression (4), because the shape of the third lens image side surface is a shape in which, as it is separating from the optical axis and going to the periphery, the negative refractive power grows weak, (furthermore, a shape having an inflection point in which, while it is a concave surface shape in the vicinity of the optical axis, it becomes a convex surface shape in the peripheral portion), the securement of the telecentric characteristic of the light flux image-formed on the image pick-up surface peripheral portion of the solid-state imaging element can be made easy.

A structure written in item 7 is provided with the same structure written in any one of items 1-6, and a structure in which the first lens, second lens, and third lens are formed of the plastic material, is applied.

According to the structure written in item 7, when the first lens, second lens, and third lens are structured by plastic lenses produced by the injection molding, even when they are lenses whose radius of curvature or outer diameter is small, the mass production becomes possible.

That is, recently, the size reduction of the whole solid image pick-up device is aimed, and even when it is a solid-state imaging element of the same pixel number, the pixel pitch is small, and as the result, a solid-state imaging element whose image pick-up surface size is small, is developed. In such an image pick-up lens for the solid-state imaging element whose image pick-up surface size is small, because it is necessary that the focal length of whole system is made proportionally short, the radius of curvature or outer diameter of each lens is considerably small. Accordingly, processing becomes difficult in the glass lens which is produced by the polishing processing.

Further, when each lens is formed of the plastic lens produced by the injection molding, the aspheric surface forming becomes easy, and the aberration correction can be finely conducted. Herein, as a lens which can be comparatively easily produced even when it is a small diameter lens, the adoption of a glass mold lens is also considered, however, generally, in the glass whose glass transition point (Tg) is high, it is necessary that the press temperature when the mold press is conducted is set high, and the wear and tear are easily generated in the molding die. As the result, the number of replacing times or the number of maintenance times of the molding die is increased, resulting in the cost-up.

Further, a phrase of "formed of the plastic material" includes a case where the plastic material is made a base material, and inorganic fine particle is mixed in the plastic material, or a case where coating processing is conducted for the purpose of the reflection prevention or an increase of surface hardness.

A structure written in item 8 is the image pick-up unit in which the solid-state imaging element having the photo-electric converting section, image pick-up lens written in any one of items 1-7 for image-forming the object image on the photo-electric converting section of the solid-state imaging element, substrate having terminals for external connection which holds the solid-state imaging element and conducts the sending and receiving of the electric signal, and housing having an aperture portion for the light incidence from the object side and formed of light shielding member, are integrally formed, and a structure in which the height along the optical axis of the image pick-up lens of the image pick-up unit is not larger than 10 mm, is applied.

According to the structure written in item 8, when any one image pick-up lens written in items 1-7, is used, the image pick-up unit provided with advantages such as more size reduction and an increase of the high image quality can be obtained.

Further, a phrase of "aperture portion for the light incidence" is not necessarily limited to a portion forming a space such as a hole, but is defined to specify a portion in which an area which can transmits the incident light from the object side, is formed.

Further, a phrase of "the height along the optical axis of the image pick-up lens of the image pick-up unit is not larger than 10 mm" is defined to mean the whole length along the optical axis direction of the image pick-up unit provided with the above-described whole structures. Accordingly, when, for example, the housing is provided on the front surface of the substrate and the electronic parts are installed on the back surface of the substrate, it is assumed that the distance from the leading edge portion which is the object side of the housing, to the leading edge portion of the electronic parts which protrudes on the back surface, is not larger than 10 mm.

A mobile terminal written in item 9 adopts the structure which is provided with the image pick-up unit written in item 8.

According to the structure written in item 9, when the image pick-up unit written in the item 8 is mounted, the above-described size reduction, weight reduction are intended, and the mobile terminal which can conduct the image pick-up of the high image quality, can be realized.

A structure written in item 10 is an image pick-up lens which consists of, in order from the object side, the first lens having the positive refractive power, and a convex surface is faced to the object side, an aperture stop, the meniscus-shaped second lens having the positive refractive power, and a convex surface is faced to the image side, and the third lens having the negative refractive power, and a concave surface is faced to the image side, and a structure in which, when a focal length of the first lens is f1, a focal length of the third lens is f3 and the focal length of the whole image pick-up lens system is f, the conditional expressions of the following (21) and (22) are satisfied, is applied.

$$0.8 < f1/f < 2.0 \quad (21)$$

$$-1.5 < f3/f < -0.5 \quad (22)$$

According to the structure written in item 10, because it is a so-called telephoto type lens construction in which, in order from the object side, the positive lens group composed of the first lens and the second lens and the third lens in which the concave surface is faced to the image side, are arranged, it is advantageous for the size reduction of the whole length, and the aberration can be finely corrected.

That is, for the aberration correction, because the positive refractive power is allotted by the first lens and the second lens, the generation of the spherical aberration or coma can be suppressed. Further, the aperture stop is arranged between the first lens and the second lens, and because the first lens has the shape in which the convex surface is faced to the object side, and the second lens has a meniscus shape in which the convex surface is faced to the image side, it is the structure in which the lateral chromatic aberration or distortion aberration is easily corrected.

Herein, the conditional expression (21) is an expression which regulates the refractive power of the first lens. When it is less than the upper limit value in the expression (21), the positive refractive power of the first lens can be appropriately maintained, and the size of the whole length of the image pick-up lens can be reduced. On the one hand, when it exceeds than the lower limit value, the refractive power of the first lens is not too large than the necessary one, and the higher order spherical aberration or coma, which generates in the first lens, can be suppressed small.

Further, the conditional expression (22) to regulate the refractive power of the third lens. When it exceeds the lower limit in the expression (22), the negative refractive power of the third lens can be appropriately maintained, and the size reduction of the whole length of lens and the correction of the off-axis aberrations such as the curvature of field or distortion aberration can be finely conducted. On the one hand, when the setting is made so as to be lower than the upper limit value of expression (22), the negative refractive power of the third lens is not too larger than the necessary one, and there is no case where the light flux image-formed on the image pick-up surface peripheral portion of the solid-state imaging element, is too much leaped up, the securement of the telecentric characteristic of the image side light flux can be made easy.

Herein, the image side tele-cetric characteristic means that, after a chief ray of light of the light flux image-formed on the image pick-up surface of the solid-state imaging element is projected from the lens final surface, it becomes almost parallel to the optical axis, in other words, the exit pupil position of the image pick-up lens is fully separated from the image surface. When the telecentric characteristic becomes poor, the light flux is incident on the solid-state imaging element from a slant direction, and a shading phenomenon by which, in the peripheral portion of the image pick-up surface, a practical aperture efficiency is decreased, is generated, and the peripheral light amount becomes insufficient. Accordingly, the image side telecentric characteristic is a necessary characteristic for an image pick-up lens using the solid-state imaging element.

Further, because the lens composition as described above is a composition which can secure a slightly large eccentricity allowance of each lens, for example, at the time of mass production, even when the optical axis of each lens is assembled in with a minute amount deviation from the same straight line, there is also the effect that the image deterioration hardly generates, and the lens performance can be appropriately maintained.

A structure written in item 11 has the same structure as an image pick-up lens written in item 10, and when a curvature radius of the image side surface of the second lens is R4, the structure in which the conditional expression of the following (31) is satisfied, is applied.

$$0.15 < |R4|/f < 0.40 \quad (31)$$

According to a structure written in item 11, the conditional expression (31) properly regulates an absolute value of the curvature radius of an image side surface of the second lens. When it exceeds the lower limit value in the expression (31), the refractive power of the image side surface of the second lens is not too larger than the necessary one, and coma flare of the off-axis light fluxes and barrel distortion are suppressed. Furthermore, in view of the lens processing, the expression is also preferable because the curvature of the second surface is not too small. On the one hand, when it is lower than the upper limit value, the refractive power of the curvature radius of the image side surface of the second lens can be adequately maintained, and the various off-axial aberrations generated in the third lens with negative power can be corrected with a well-balance. Moreover, a securement of the telecentric characteristic of the image side light flux can be made easy. It is more preferable, when the following conditional expression is satisfied.

$$0.18 < |R4|/f < 0.30 \quad (32)$$

A structure written in item 12 is provided with the same structure as the image pick-up lens written in item 10, and a structure in which the first lens is a meniscus shape in which the convex surface is faced to the object side, is applied.

According to the structure written in item 12, the shape of the first lens and the second lens is a symmetrical shape with an aperture stop between them, and the spherical aberration or coma generated in the first lens can be more finely corrected.

Further, it becomes the structure by which the lateral chromatic aberration or distortion aberration of the whole image pick-up lens system can be more easily corrected.

A structure written in item 13 is provided with the same structure as item 10, and a structure in which the third lens is a meniscus shape in which the concave surface is faced to the image side, is applied.

According to the structure written in item 13, because the third lens is a meniscus shape in which the concave surface is faced to the image side, the main point position of the third lens can be moved to the image side, and while the lens whole length of the whole image pick-up lens system is reduced, a sufficient back-focus can be secured.

Further, because an air lens between the second lens and the third lens is both concave shape, by its positive refractive power, the securement of the telecentric characteristic of the light flux image-formed on the image pick-up surface peripheral portion of the solid-state imaging element can be made easy.

A structure written in item 14 is provided with the same structure as any one of items 10-13, and the image side surface of the third lens has a structure in which, when the apex of the image side surface is an origin, the X axis is defined in the optical axis direction, the height along the direction perpendicular to the optical axis is h, i-order aspherical coefficient of the image side surface of the third lens is Ai, radius of curvature of the image side surface of the third lens is R6, and conic constant of the image side surface of the third lens is K6, the aspherical surface displacement X expressed by the following expression (25) and the displacement of rotational quadric surface component X0 of the aspherical surface expressed by the following expression (26) satisfy the conditional expression of the following (24) in a range of height h in the arbitrary optical axis perpendicular direction which becomes hmax×0.7<h<hmax, to the maximum effective radius hmax.

$$X - X0 < 0 \qquad (24)$$

$$X = \frac{\frac{h^2}{R6}}{1 + \sqrt{1 - (1 + K6)h^2 / R6^2}} + \sum A_i h^i \qquad (25)$$

$$X0 = \frac{\frac{h^2}{R6}}{1 + \sqrt{1 - (1 + K6)h^2 / R6^2}} \qquad (26)$$

Herein, an apex of the image side surface of the third lens is defined as an intersection of the image side surface and the optical axis.

According to the structure written in item 14, when it is made an aspheric shape which satisfies the conditional expression (24), because the shape of the third lens image side surface is a shape in which, as it is separating from the optical axis and going to the periphery, the negative refractive power grows weak, (furthermore, a shape having an inflection point in which, while it is a concave surface shape in the vicinity of the optical axis, it becomes a convex surface shape in the peripheral portion), the securement of the telecentric characteristic of the light flux image-formed on the image pick-up surface peripheral portion of the solid-state imaging element can be made easy.

A structure written in item 15 is provided with the same structure written in any one of items 10-14, and a structure in which the first lens, second lens, and third lens are formed of the plastic material, is applied.

According to the structure written in item 15, when the first lens, second lens, and third lens are structured by plastic lenses produced by the injection molding, even when they are lenses whose radius of curvature or outer diameter is small, the mass production becomes possible.

That is, recently, the size reduction of the whole solid image pick-up device is aimed, and even when it is a solid-state imaging element of the same pixel number, the pixel pitch is small, and as the result, a solid-state imaging element whose image pick-up surface size is small, is developed. In such an image pick-up lens for the solid-state imaging element whose image pick-up surface size is small, because it is necessary that the focal length of whole system is made proportionally short, the radius of curvature or outer diameter of each lens is considerably small. Accordingly, processing becomes difficult in the glass lens which is produced by the polishing processing.

Further, when each lens is formed of the plastic lens produced by the injection molding, the aspheric surface forming becomes easy, and the aberration correction can be finely conducted. Herein, as a lens which can be comparatively easily produced even when it is a small diameter lens, the adoption of a glass mold lens is also considered, however, generally, in the glass whose glass transition point (Tg) is high, it is necessary that the press temperature when the mold press is conducted is set high, and the wear and tear are easily generated in the molding die. As the result, the number of replacing times or the number of maintenance times of the molding die is increased, resulting in the cost-up.

Further, a phrase of "formed of the plastic material" includes a case where the plastic material is made a base material, and inorganic fine particle is mixed in the plastic material, or a case where coating processing is conducted for the purpose of the reflection prevention or an increase of surface hardness.

A structure written in item 16 is the image pick-up unit in which the solid-state imaging element having the photo-electric converting section, image pick-up lens written in any one of items 10-15 for image-forming the object image on the photo-electric converting section of the solid-state imaging element, substrate having terminals for external connection which holds the solid-state imaging element and conducts the sending and receiving of the electric signal, and housing having an aperture portion for the light incidence from the object side and formed of light shielding member, are integrally formed, and a structure in which the height along the optical axis of the image pick-up lens of the image pick-up unit is not larger than 10 mm, is applied.

According to the structure written in item 16, when any one image pick-up lens written in items 10-15, is used, the image pick-up unit provided with advantages such as more size reduction and an increase of the high image quality can be obtained.

Further, a phrase of "aperture portion for the light incidence" is not necessarily limited to a portion forming a space such as a hole, but is defined to specify a portion in which an area which can transmits the incident light from the object side, is formed.

Further, a phrase of "the height along the optical axis of the image pick-up lens of the image pick-up unit is not larger than 10 mm" is defined to mean the whole length along the optical axis direction of the image pick-up unit provided with the above-described whole structures. Accordingly, when, for example, the housing is provided on the front surface of the substrate and the electronic parts are installed on the back surface of the substrate, it is assumed that the distance from the leading edge portion which is the object side of the housing, to the leading edge portion of the electronic parts which protrudes on the back surface, is not larger than 10 mm.

A mobile terminal written in item 17 adopts the structure which is provided with the image pick-up unit written in item 16.

According to the structure written in item 17, when the image pick-up unit written in the item 16 is mounted, the above-described size reduction, weight reduction are intended, and the mobile terminal which can conduct the image pick-up of the high image quality, can be realized.

According to the structure written in item 1, the first lens, second lens, and third lens are lens composition of so-called telephoto type, and the size reduction of the whole lens length can be intended, and the aberration can be finely corrected.

Further, because the positive refractive power is allotted by the first lens and the second lens, generation of the spherical aberration or coma can be suppressed. Further, because the aperture stop is arranged between the first lens and the second lens, and the first lens has the shape in which the convex surface is faced to the objective side, and the second lens is a meniscus shape in which the convex surface is faced to the image side, the correction of the lateral chromatic aberration or distortion aberration can be made easy.

Further, according to the conditional expression (1) which regulates the refractive index of the first lens, when the setting is made so as to be lower than the upper limit value, the positive refractive index of the first lens can be appropriately maintained, and the size reduction of the whole length of the image pick-up lens becomes possible. On the one hand, when the setting is made so as to be larger than the lower limit value, the positive refractive index of the first lens is not too larger than the necessary one, and the high order spherical aberration or coma, which generates in the first lens, can be suppressed small.

Further, according to the conditional expression (2) to finely correct the chromatic aberration of the whole image pick-up lens system, when setting is made so as to be larger than the lower limit value, the axial chromatic aberration and lateral chromatic aberration can be corrected with a well-balance. Further, when the setting is lower than the upper limit value in the expression (2), the lens material which is practically not appropriate, can be excluded.

According to the structure written in item 2, when the setting is made so as to be larger than the lower limit value according to the conditional expression (3) to regulate the refractive power of the third lens, the negative refractive power of the third lens can be appropriately maintained, and the size reduction of the whole length of lens and the correction of the off-axis aberrations such as the curvature of field or distortion aberration can be finely conducted. On the one hand, when the setting is made so as to be lower than the upper limit value of expression (3), the negative refractive power of the third lens is not too larger than the necessary one, and there is no case where the light flux image-formed on the image pick-up surface peripheral portion of the solid-state imaging element, is too much leaped up, the securement of the telecentric characteristic of the image side light flux can be made easy.

According to a structure written in item 3, the conditional expression (11) which properly regulates an absolute value of the curvature radius of an image side surface of the second lens, allows that the refractive power of the image plane of the second lens is not too larger than the necessary one, and coma flare of the off-axis light fluxes and barrel distortion are suppressed when it exceeds the lower limit value in the expression (11). Furthermore, in view of the lens processing, the expression is also preferable because the curvature of the second plane is not too small. On the one hand, when it is lower than the upper limit value, the refractive power of the curvature radius of the image side surface of the second lens can be adequately maintained, and the various off-axial aberrations generated in the third lens with negative power can be corrected with a well-balance. Moreover, a securement of the telecentric characteristic of the image side light flux can be made easy. the shape of the first lens and the second lens is a symmetrical shape with an aperture stop between them, and the spherical aberration or coma generated in the first lens can be more finely corrected.

Moreover, it becomes the structure by which the lateral chromatic aberration or distortion aberration of the whole image pick-up lens system can be more easily corrected.

According to the structure written in item 4, because the shape of the first lens and the second lens is a symmetrical shape with an aperture stop between them, the spherical aberration or coma, generated in the first lens, can be more finely corrected.

Further, it becomes a structure in which the lateral chromatic aberration or distortion aberration of the whole image pick-up lens system is more easily corrected.

According to the structure written in item 5, because the third lens is a meniscus shape in which the concave surface is faced to the image side, the main point position of the third lens can be moved to the image side, and while the whole length of the lens of the whole image pick-up lens system is reduced, the sufficient back focus can be secured.

Further, because air lens between the second lens and the third lens becomes a both-concave shape, by its positive refractive power, the securement of the telecentric characteristic of the light flux image-formed on the image pick-up surface peripheral portion of the solid-state imaging element can be made easy.

According to the structure written in item 6, when the third lens image side surface which is a surface positioned at the most image side, is made an aspheric surface shape which satisfies the conditional expression (4), the securement of the telecentric characteristic of the light flux image-formed on the image pick-up surface peripheral portion of the solid-state imaging element can be made easy.

According to the structure written in item 7, when the first lens, second lens, and third lenses are structured by plastic lenses produced by the injection molding, even when they are lenses whose radius of curvature or outer diameter is small, the mass production becomes possible.

Further, because the formation of aspheric surface is easy, the aberration correction can be easily and accurately conducted.

According to the structure written in item 8, when the image pick-up lens by which above-described each effect can be realized, is mounted, the image pick-up unit provided with advantages such as size reduction, weight reduction, formation of high image quality, can be provided.

According to the structure written in item 9, when the image pick-up unit by which above-described each effect can be realized, is mounted, while intending the size reduction and weight reduction, the mobile terminal by which the high image quality image pick-up can be conducted, can be provided.

According to the structure written in item 10, the first lens, second lens, and third lens are lens composition of so-called telephoto type, and the size reduction of the whole lens length can be intended, and the aberration can be finely corrected.

Further, because the positive refractive power is allotted by the first lens and the second lens, generation of the spherical aberration or coma can be suppressed. Further, because the aperture stop is arranged between the first lens and the second lens, and the first lens has the shape in which the convex surface is faced to the objective side, and the second lens is a meniscus shape in which the convex surface is faced to the image side, the correction of the lateral chromatic aberration or distortion aberration can be made easy.

Furthermore, according to the conditional expression (21) which regulates the refractive power of the first lens, when the setting is made so as to be lower than the upper limit value, the positive refractive power of the first lens can be appropriately maintained, and the size reduction of the whole length of the image pick-up lens becomes possible. On the one hand, when it exceeds than the lower limit value, the refractive power of the first lens is not too large than the necessary one, and the higher order spherical aberration or coma, which generates in the first lens, can be suppressed small.

Further, the conditional expression (22) to regulate the refractive power of the third lens, when the setting is made so as to be upper than the lower limit value, the negative refractive power of the third lens can be appropriately maintained, and the size reduction of the whole length of lens and the correction of the off-axis aberrations such as the curvature of field or distortion aberration can be finely conducted. On the one hand, when the setting is made so as to be lower than the upper limit value of expression (22), the negative refractive power of the third lens is not too larger than the necessary one, and there is no case where the light flux image-formed on the image pick-up surface peripheral portion of the solid-state imaging element, is too much leaped up, the securement of the telecentric characteristic of the image side light flux can be made easy.

According to a structure written in item 11, the conditional expression (31) which properly regulates an absolute value of the curvature radius of an image side surface of the second lens, allows that the refractive power of the image plane of the second lens is not too larger than the necessary one, and coma flare of the off-axis light fluxes and barrel distortion are suppressed when it exceeds the lower limit value in the expression (11). Furthermore, in view of the lens processing, the expression is also preferable because the curvature of the second plane is not too small. On the one hand, when it is lower than the upper limit value in the expression (11), the refractive power of the curvature radius of the image side surface of the second lens can be adequately maintained, and the various off-axial aberrations generated in the third lens with negative power can be corrected with a well-balance. Moreover, a securement of the telecentric characteristic of the image side light flux can be made easy. the shape of the first lens and the second lens is a symmetrical shape with an aperture stop between them, and the spherical aberration or coma generated in the first lens can be more finely corrected.

Moreover, it becomes the structure by which the lateral chromatic aberration or distortion aberration of the whole image pick-up lens system can be more easily corrected.

According to the structure written in item 12, the shape of the first lens and the second lens is a symmetrical shape with an aperture stop between them, and the spherical aberration or coma generated in the first lens can be more finely corrected.

Further, it becomes the structure by which the lateral chromatic aberration or distortion aberration of the whole image pick-up lens system can be more easily corrected.

According to the structure written in item 13, because the third lens is a meniscus shape in which the concave surface is faced to the image side, the main point position of the third lens can be moved to the image side, and while the lens whole length of the whole image pick-up lens system is reduced, a sufficient back-focus can be secured.

Further, because an air lens between the second lens and the third lens is both concave shape, by its positive refractive power, the securement of the telecentric characteristic of the light flux image-formed on the image pick-up surface peripheral portion of the solid-state imaging element can be made easy.

According to the structure written in item 14, when the image side surface of the third lens positioned closest to the image plane is made an aspheric shape which satisfies the conditional expression (24), the securement of the telecentric characteristic of the light flux image-formed on the image pick-up surface peripheral portion of the solid-state imaging element can be made easy.

According to the structure written in item 15, when the first lens, second lens, and third lenses are structured by plastic lenses produced by the injection molding, even when they are lenses whose radius of curvature or outer diameter is small, the mass production becomes possible.

Further, because the formation of aspheric surface is easy, the aberration correction can be easily and accurately conducted.

According to the structure written in item 16, when the image pick-up lens by which above-described each effect can be realized, is mounted, the image pick-up unit provided with advantages such as size reduction, weight reduction, formation of high image quality, can be provided.

According to the structure written in item 17, when the image pick-up unit by which above-described each effect can be realized, is mounted, while intending the size reduction and weight reduction, the mobile terminal by which the high image quality image pick-up can be conducted, can be provided.

Figure 2:
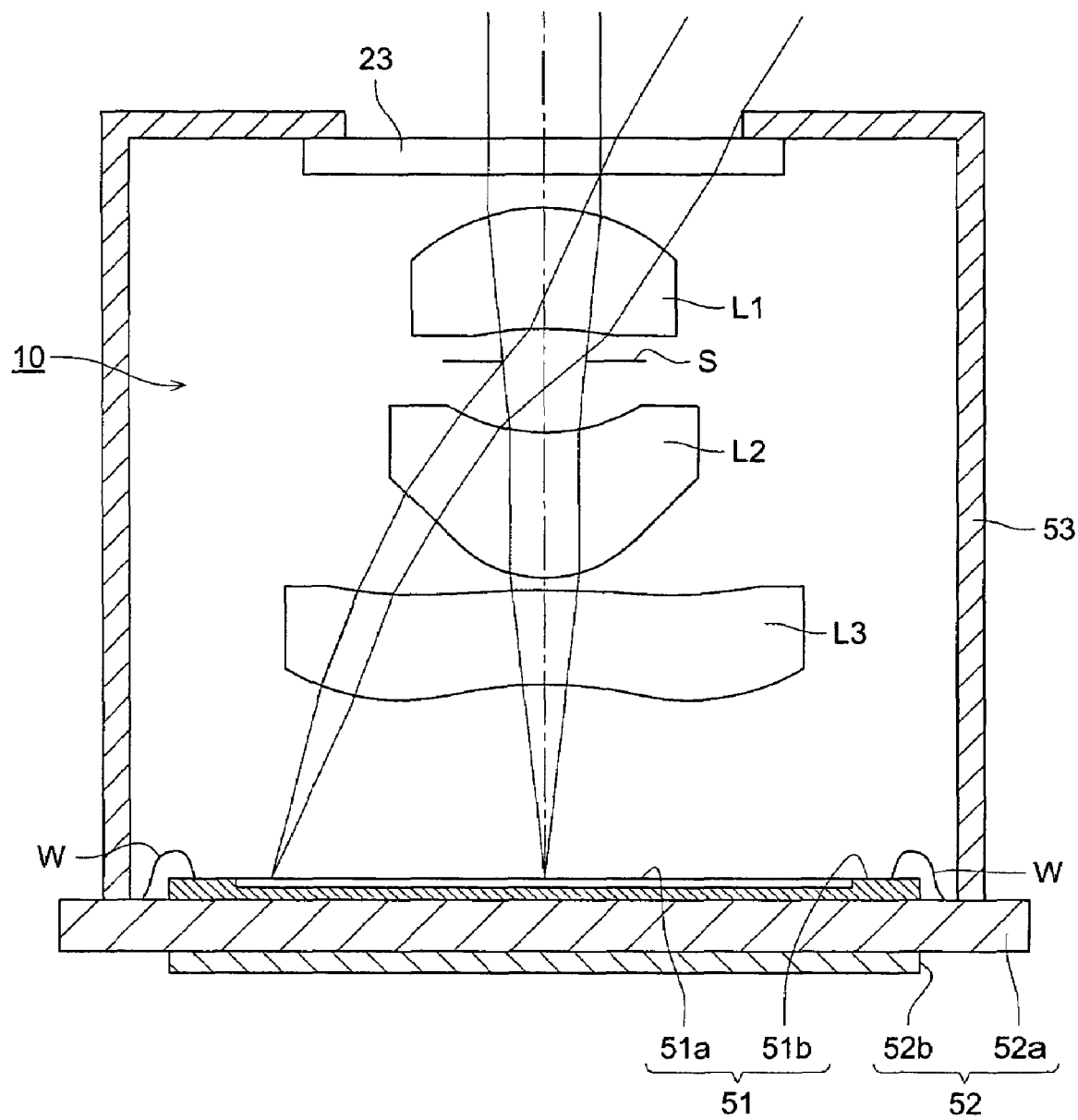
FIG. 2 shows a typical sectional view in a cross section including an optical axis of each lens of the image pick-up unit which is an embodiment of the present invention.

According to FIG. 1 and FIG. 2, embodiments of the present invention will be described below. FIG. 1 shows a perspective view of an image pick-up unit 50 which is the present embodiment, and FIG. 2 is a view in which a cross section along the optical axis of an image pick-up optical system of the image pick-up unit 50 is typically shown.

The image pick-up unit 50 is provided with a CMOS type image sensor 51 as a solid-state imaging element having a photoelectric conversion section 51a, and an image pick-up optical system 10 as an image pick-up lens by which an object image is image picked-up on the photoelectric conversion section 51a of this image sensor 51, a substrate 52 having a terminal 54 for external connection which holds the image sensor 51, and conducts sending and receiving of its electric signal, and a housing 53 as a lens barrel which has an aperture for light incidence from the object side and is composed of a light shielding member, and they are integrally formed.

In the image sensor 51, the photoelectric conversion section 51a as a light receiving section in which, in the central portion of a plane on its light receiving side, the pixel (photoelectric conversion element) is second dimensionally arranged is formed, and in its periphery, a signal processing circuit 51b is formed. Such a signal processing circuit is structured by a drive circuit section by which each pixel is successively driven and a signal electric charge is obtained, A/D conversion section by which each signal electric charge is converted into a digital signal, and a signal processing section by which an image signal output is formed by using this digital signal. Further, in the vicinity of periphery of the plane on the light receiving side of the image sensor 51, many number of pads (drawing is neglected) are arranged and connected to a substrate 52 through a wire W. The image sensor 51 converts the signal electric charge from the photo conversion section 51a into an image signal such as a digital YUV signal, and outputs it to a predetermined circuit on the substrate 52 through the wire W. Herein, Y is a luminance signal, U(=R−Y) is a color difference signal between red and the luminance signal, and V(=B−Y) is a color difference signal between blue and the luminance signal.

Further, the image pick-up element is not limited to the CMOS type image sensor, but the other one such as CCD may be used.

The substrate 52 has a support plate 52a to support the image sensor 51 and a housing 53 on its one plane, and a flexible substrate 52b whose one end portion is connected to the rear surface (opposite side surface to the image sensor 51) of the support plate 52a.

The support plate 52a has many number of pads for signal transmission provided on front and rear surfaces, and on its one plane side, it is connected to the wire W of the above-described image sensor 51, and on rear surface side, connected to the flexible substrate 52b.

In the flexible substrate 52b, its one end portion is connected to the support plane 52a as described above, and the support plane 52a and the external circuit (for example, a control circuit which is possessed by the higher device in which the image pick-up unit is mounted) are connected through the external output terminal 54 provided on its other end portion, and the flexible substrate receives the supply of the voltage for driving the image sensor 51 or clock signal from the external circuit, or can output the digital YUV signal to the external circuit. Furthermore, a middle portion in the length direction of the flexible substrate has the flexibility or deformation property, and by its deformation, degree of freedom is given to the support plane 52a, for the sense or arrangement of the external output terminal.

The housing 53 is fixedly equipped on the plane on which the image sensor 51 on the support plate 52a of the substrate 52 is provided, by adhesion, under the condition that the image sensor 51 is housed in its inside. That is, the housing 53 is formed in such a manner that a portion on the image sensor 51 side is widely opened in a manner that it surrounds the image sensor 51, and the other end portion is formed bottomed-cylindrically having an aperture, and on the support plate 52a, the end portion on the image sensor 51 side is contacted with and fixed on it. Further, the end portion on the image sensor 51 side of the housing 53, may also be contacted with the periphery of the photoelectric conversion section 51a on the image sensor 51 and fixed.

Further, the housing 53 is used in such a manner that the other end portion on which an aperture is provided, is faced to the object side, and inside the aperture, an IR (infrared ray) cut filter 23 of an image pick-up optical system, which will be described later, is provided. Then, in the housing 53, the image pick-up optical system 10 is housed and held.

The image pick-up optical system 10 has: the IR cut filter 23 preventing the incidence of the infrared ray from the object side; the image pick-up lens in which the first lens L1 having the positive refractive power and facing the convex surface to the object side, the meniscus shaped second lens L2 having the positive refractive power and facing the convex surface to the object side, and the third lens L1 having the negative refractive power and facing the concave surface to the object side, are arranged in the order from the object side; and the aperture stop S arranged between the first lens L1 and the second lens L2.

This image pick-up optical system 10 structures the aperture stop S and each of lenses L1, L2 and L3 as the optical system, and conducts the image formation of the object image on the solid-state imaging element. Further, in FIG. 1, it is defined that the upper side is the object side and the lower side is the image side, and the dashed line in FIG. 2 is the optical axis common to each of lenses L1, L2 and L3.

The IR cut filter 23 is, for example, an almost rectangle-likely or circularly formed member. Further, although the drawing is neglected, an external light shielding mask for making the incidence of unnecessary light from the outside as small as possible, may also be provided on further object side than this IR cut filter 23.

The aperture stop S is a member for determining F-number of the whole image pick-up lens system.

Each of lenses L1, L2 and L3 is housed in the housing under the condition that its optical axis and the central line of the housing 53 are coincident.

These lenses L1, L2 and L3, although the drawing is neglected, for example, a range from the center of each to a predetermined range is set to a range of the effective diameter having the function as the image pick-up lens, and an outside portion from that may also be set to a flange portion which does not function as the image pick-up lens. In this case, each of lenses L1, L2 and L3 can be held in the housing 53, when the outer peripheral portion of its flange portion is put on a predetermined position of the housing 53.

Recently, the size reduction of the whole image pick-up device is made an object, and even when it is the image pick-up element of the same pixel number, the image pick-up element in which the pixel pitch is small, and as the result, the image plane size of the light receiving section (photoelectric conversion section) is small, is developed. In such an image pick-up lens for the solid-state imaging element whose image plane size is small, for securing the same image angle, because it is necessary that the focal length of the whole system is shortened, the radius of curvature or outer diameter of each lens becomes considerably small. Accordingly, the processing is difficult in the glass lens produced by the polishing processing. Accordingly, it is desirable that each of lenses L1, L2 and L3 is formed by the injection molding by making plastic as the raw material. Further, as the image pick-up device, in the case where it is desired that the position variation of image point of the whole image pick-up lens system at the time of temperature change is suppressed small, it is desirable that the first lens is formed of a glass mold lens.

Further, the detailed specification of each of lenses L1, L2 and L3 will be described by using a plurality of specific examples in examples which will be described below.

Further, although the drawing is omitted, a light shielding mask may also be arranged between the IR cut filter 23 and the first lens L1, and between the second lens L2 and the third lens L3, and in this case, by the mutual action of these light shielding masks and the aperture stop S, it is prevented that the light incident from the IR cut filter is incident on the outside of the effective diameter of the image pick-up lens of the first lens L1, and that the light incident from the aperture stop S is incident on the outside of the effective diameter of the image pick-up lens of the second lens L2 and the third lens L3, and the generation of a ghost or flare can be suppressed.

A mode of use of the image pick-up unit 50 will be described below. FIG. 3 shows a situation in which the image pick-up unit 50 is equipped to the cell phone 100 as a mobile terminal or image pick-up device. Further, FIG. 4 is a control block diagram of the cell phone 100.

In the image pick-up unit 50, for example, the object side end surface of the housing 53 in the image pick-up optical system is provided on the rear surface (liquid crystal display section side is a front surface) of the cell phone 100, and arranged at a position corresponding to a below portion of the liquid crystal display section.

Then, an external connection terminal 54 of the image pick-up unit 50 is connected to the control section 101 of the cell phone 100, and an image signal such as a luminance signal or color difference signal is outputted to the control section 101 side.

Figure 4:
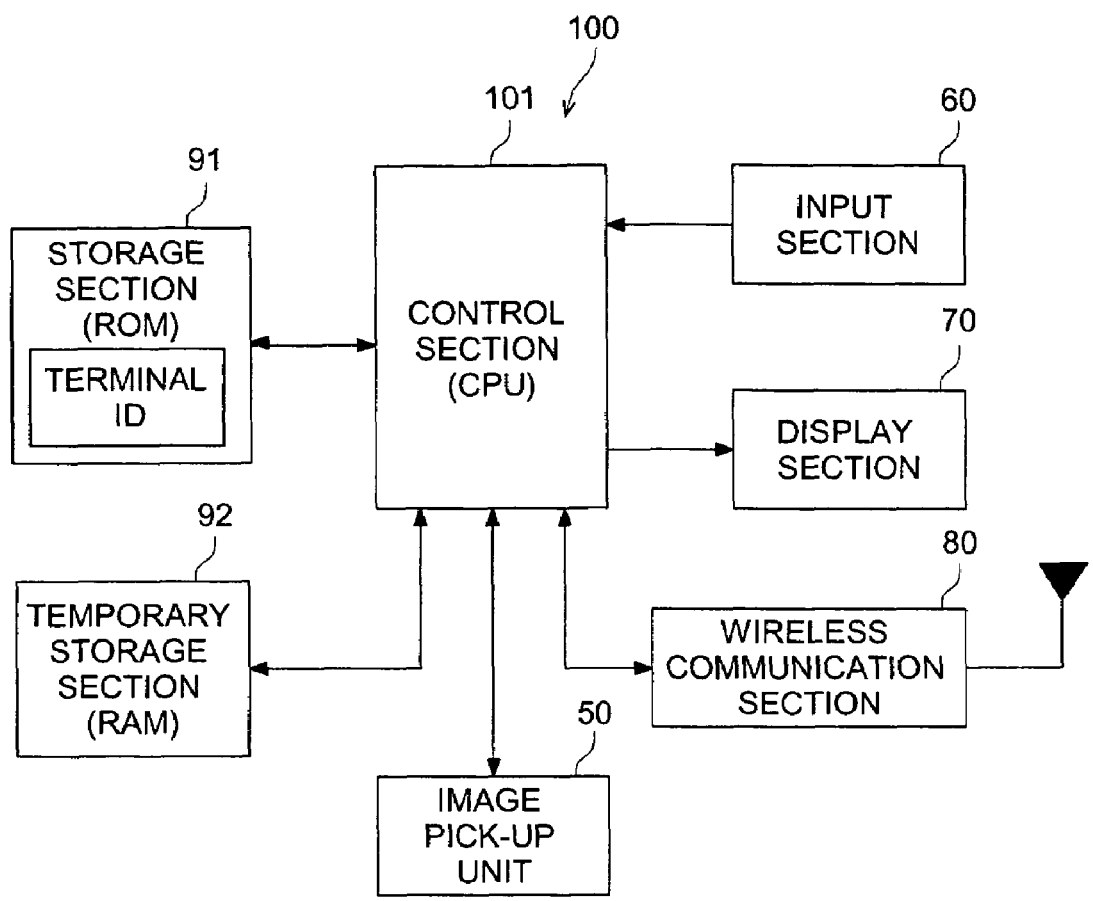
FIG. 4 is a control block diagram of the cell phone of FIG. 3.

On the one hand, the cell phone 100, as shown in FIG. 4, controls each section generalization-likely, and is provided with: a control section (CPU) 101 which conducts a program corresponding to each processing; input section 60 for instructing and inputting a number by a key; display section 70 for display a picked-up image other than a predetermined data; wireless communication section 80 for realizing each kind of information communication between it and external server; storage section (ROM) 91 which stores a system program of the cell phone 100, each kind of processing program and necessary data such as terminal ID; and temporary storage section (RAM) 92 which is used a working area for temporarily storing each kind of processing program conducted by the control section 101 or data, or processing data, or the image pick-up data by the image pick-up unit. 50. Then, an image signal inputted from the image pick-up unit 50 is stored in the storage section 92 or displayed on the display section 70, by the control system of the cell phone 100, and furthermore, transmitted to the outside as an image information through the wireless communication section 80.

EXAMPLE 1

Next, the specification of the image pick-up lens will be described according to examples 1-5, however, each of specifications is not limited to this. Herein, the sign used for each example is as follows.
f: Focal length of the whole image pick-up lens system
fB: Back focus
F: F-number
2Y: Image pick-up surface diagonal length of solid-state imaging element
R: Radius of curvature of a refractive surface
D: On-axial surface interval of refractive surfaces
Nd: Refractive index in d-line of lens material
vd: Abbe's number of lens material Further, in each example, the shape of aspheric surface is shown by the following expression expressed by the following (27), where an apex of the surface is the origin, and X axis is set in the optical axis direction, height in perpendicular direction to the optical axis is h, apex radius of curvature is R, conical constant is K, and i-order aspheric surface coefficient is Ai.

$$X = \frac{\frac{h^2}{R}}{1 + \sqrt{1 - (1+K)h^2/R^2}} + \sum A_i h^i \quad (27)$$

THE 1ST EXAMPLE

The image pick-up lens data is shown in Tables 1 and 2, and numerical value corresponding to each conditional expression is shown in Table 3.

TABLE 1

(Example 1)
f = 3.81 mm, fB = 1.65 mm, F = 2.88, 2Y = 4.61 mm

| Surface No. | R (mm) | D (mm) | Nd | vd |
|---|---|---|---|---|
| 1 | 1.818 | 1.00 | 1.53180 | 56.0 |
| 2 | 3.713 | 0.25 | | |
| Stop | ∞ | 0.62 | | |
| 3 | −1.687 | 1.22 | 1.53180 | 56.0 |
| 4 | −0.900 | 0.10 | | |
| 5 | 6.800 | 0.78 | 1.58300 | 30.0 |
| 6 | 1.534 | | | |

TABLE 2

| | Aspheric surface coefficient |
|---|---|
| The 1st surface | K = 9.15720 × 10$^{-1}$<br>A4 = −3.85700 × 10$^{-3}$<br>A6 = 1.19250 × 10$^{-3}$<br>A8 = 1.54340 × 10$^{-3}$<br>A10 = −1.05850 × 10$^{-3}$ |
| The 2nd surface | K = 1.90040 × 10<br>A4 = 1.42930 × 10$^{-3}$<br>A6 = 6.64670 × 10$^{-2}$<br>A8 = −1.05450 × 10$^{-1}$<br>A10 = −2.10100 × 10$^{-2}$ |
| The 3rd surface | K = −1.94220 × 10$^{-1}$<br>A4 = −2.56700 × 10$^{-2}$<br>A6 = −2.35200 × 10$^{-1}$<br>A8 = 3.40250 × 10$^{-1}$<br>A10 = −7.14810 × 10$^{-2}$ |
| The 4th surface | K = −2.82330<br>A4 = −2.17930 × 10$^{-1}$<br>A6 = 1.31190 × 10$^{-1}$<br>A8 = −8.59110 × 10$^{-2}$<br>A10 = 2.63410 × 10$^{-2}$<br>A12 = 6.50500 × 10$^{-4}$ |
| The 5th surface | K = −9.76570 × 10<br>A4 = −6.25440 × 10$^{-2}$<br>A6 = 3.00290 × 10$^{-2}$<br>A8 = −4.57290 × 10$^{-3}$<br>A10 = −2.41900 × 10$^{-4}$<br>A12 = 5.36600 × 10$^{-5}$ |
| The 6th surface | K = −1.09320 × 10<br>A4 = −6.92620 × 10$^{-2}$<br>A6 = 1.64970 × 10$^{-2}$<br>A8 = −1.80070 × 10$^{-3}$<br>A10 = −1.61900 × 10$^{-5}$<br>A12 = 1.13470 × 10$^{-6}$ |

TABLE 3

| | Example 1 |
|---|---|
| (1), (8) f1/f | 1.49 |
| (3), (9) f3/f | −0.94 |
| (2) {(v1 + v2)/2} − v3 | 26.0 |
| (4), (10) \|R4\|/f | 0.24 |
| (5), (11) X − X0 | h = hmax (2.1 mm)<br>−0.6319<br>h = 0.7 × hmax<br>−0.1969 |
| (7) L/2Y | 1.22 |

Figure 5:
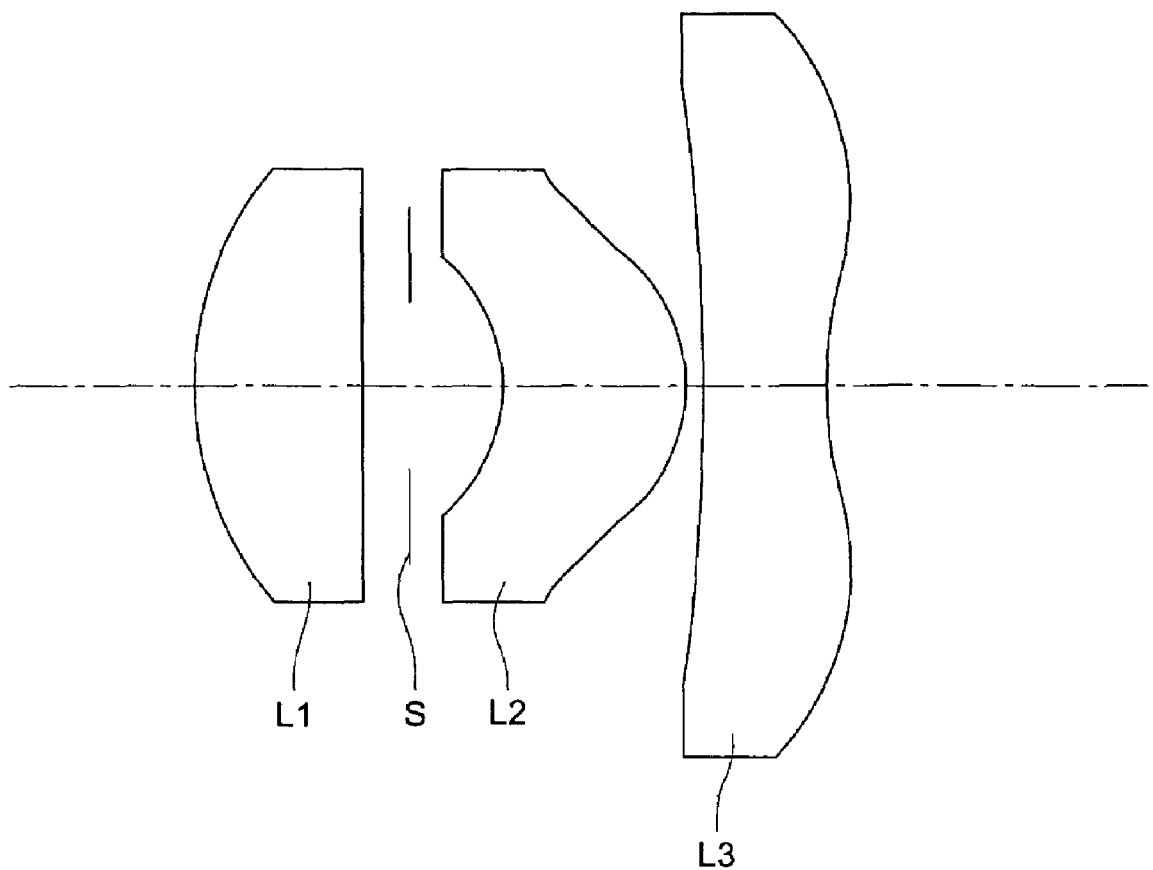
FIG. 5 is an explanatory view showing the lens arrangement of example 1.

FIG. 5 is an explanatory view showing an image pick-up lens arrangement of the first example. In the view, L1 is the first lens, L2 is the second lens, L3 is the third lens, and S shows an aperture stop. FIGS. 6(*a*), 6(*b*) and 6(*c*) are aberration views (spherical aberration, astigmatism, distortion aberration, meridional coma) of example 1.

EXAMPLE 2

The image pick-up lens data is shown in Tables 4 and 5, and numerical values corresponding to each conditional expression are shown in Table 6.

TABLE 4

(Example 2)
f = 3.56 mm, fB = 1.48 mm, F = 2.88, 2Y = 4.61 mm

| Surface No. | R (mm) | D (mm) | Nd | vd |
|---|---|---|---|---|
| 1 | 1.711 | 0.90 | 1.53180 | 56.0 |
| 2 | 9.269 | 0.25 | | |

TABLE 4-continued (Example 2)
f = 3.56 mm, fB = 1.48 mm, F = 2.88, 2Y = 4.61 mm

| Surface No. | R (mm) | D (mm) | Nd | vd |
|---|---|---|---|---|
| Stop | ∞ | 0.46 | | |
| 3 | −1.167 | 0.98 | 1.53180 | 56.0 |
| 4 | −0.748 | 0.10 | | |
| 5 | 26.830 | 0.65 | 1.58300 | 30.0 |
| 6 | 1.453 | | | |

TABLE 5

Aspheric surface coefficient

| | |
|---|---|
| The 1st surface | K = 3.94660 × $10^{-1}$ |
| | A4 = −1.20790 × $10^{-2}$ |
| | A6 = −1.20570 × $10^{-2}$ |
| | A8 = 1.00970 × $10^{-2}$ |
| | A10 = −1.31300 × $10^{-2}$ |
| | A12 = −1.31310 × $10^{-3}$ |
| The 2nd surface | K = −5.01610 × 10 |
| | A4 = −2.11260 × $10^{-2}$ |
| | A6 = −2.27930 × $10^{-3}$ |
| | A8 = −8.49250 × $10^{-2}$ |
| | A10 = 8.15610 × $10^{-2}$ |
| | A12 = −2.06740 × $10^{-2}$ |
| The 3rd surface | K = −1.16690 × $10^{-1}$ |
| | A4 = −8.99550 × $10^{-2}$ |
| | A6 = −4.25790 × $10^{-1}$ |
| | A8 = 4.54500 × $10^{-1}$ |
| | A10 = −3.46760 × $10^{-2}$ |
| | A12 = −1.95040 × $10^{-12}$ |
| The 4th surface | K = −2.98890 |
| | A4 = −3.2280 × $10^{-1}$ |
| | A6 = 2.52660 × $10^{-1}$ |
| | A8 = −1.94250 × $10^{-1}$ |
| | A10 = 7.76110 × $10^{-2}$ |
| | A12 = 6.35480 × $10^{-3}$ |
| The 5th surface | K = 1.00000 × $10^{2}$ |
| | A4 = −8.85700 × $10^{-2}$ |
| | A6 = 5.41380 × $10^{-2}$ |
| | A8 = −1.13310 × $10^{-2}$ |
| | A10 = −6.02900 × $10^{-4}$ |
| | A12 = 2.83960 × $10^{-4}$ |
| The 6th surface | K = −1.61000 × 10 |
| | A4 = −8.89690 × $10^{-2}$ |
| | A6 = 2.43220 × $10^{-2}$ |
| | A8 = −3.90280 × $10^{-3}$ |
| | A10 = 3.05770 × $10^{-4}$ |
| | A12 = −4.06290 × $10^{-5}$ |

TABLE 6

| | Example 2 |
|---|---|
| (1), (8) f1/f | 1.06 |
| (3), (9) f3/f | −0.75 |
| (2) {(v1 + v2)/2} − v3 | 26.0 |
| (4), (10) |R4|/f | 0.21 |
| (5), (11) X − X0 | h = hmax (2.0 mm) |
| | −0.7193 |
| | h = 0.7 × hmax |
| | −0.2097 |
| (7) L/2Y | 1.05 |

Figure 7:
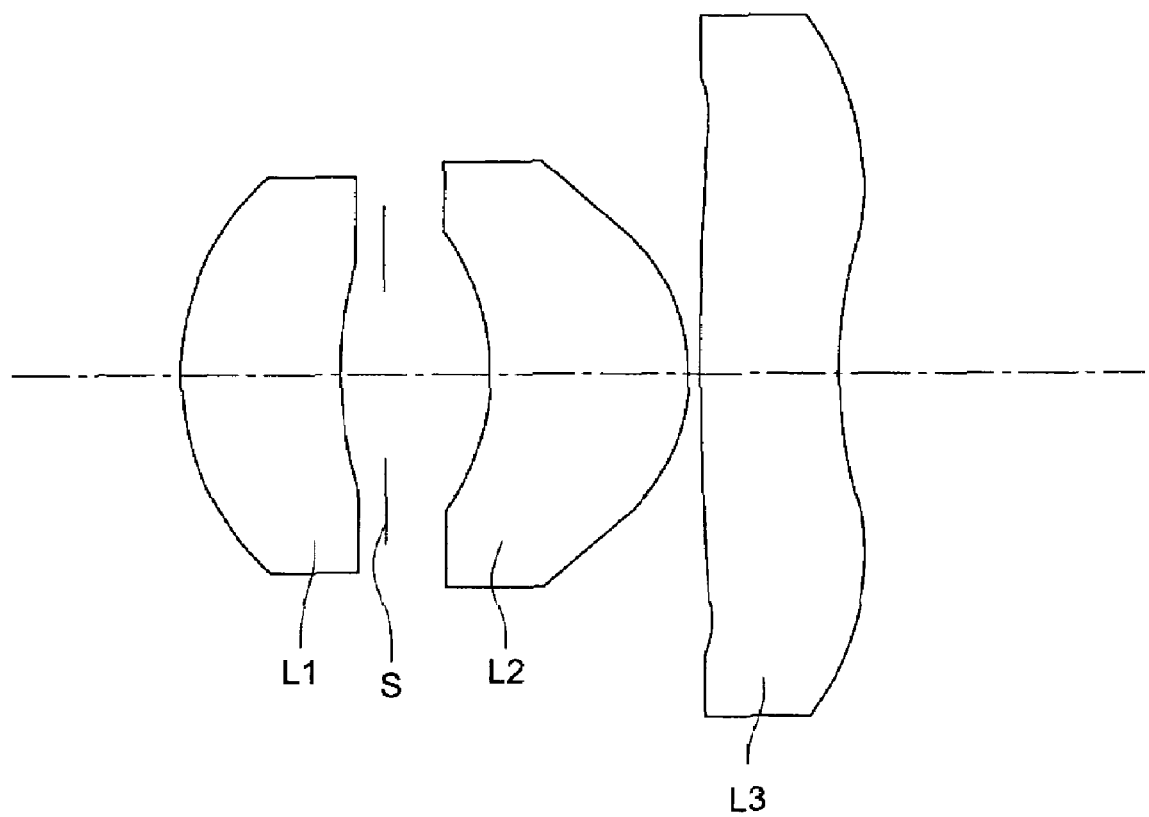
FIG. 7 is an explanatory view showing an image pick-up lens arrangement of example 2.
Figure 8A:
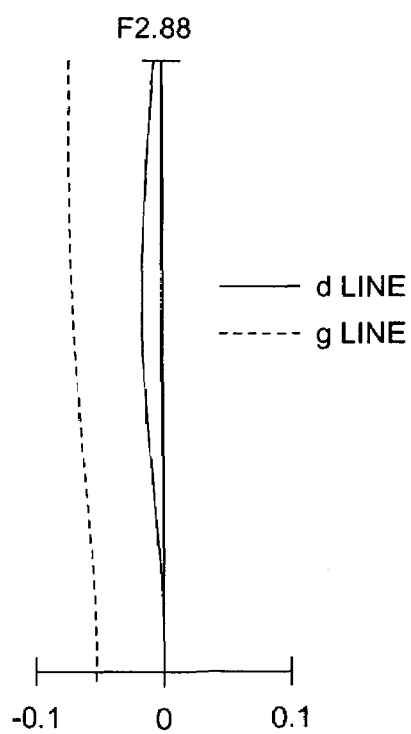
FIGS. 8(a), 8(b) and 8(c) are aberration views (spherical aberration, astigmatism, distortion aberration, meridional coma) of example 2.
Figure 8B:
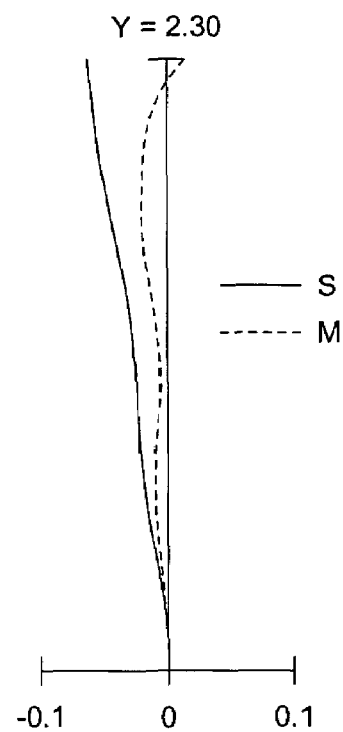
Figure 8C:
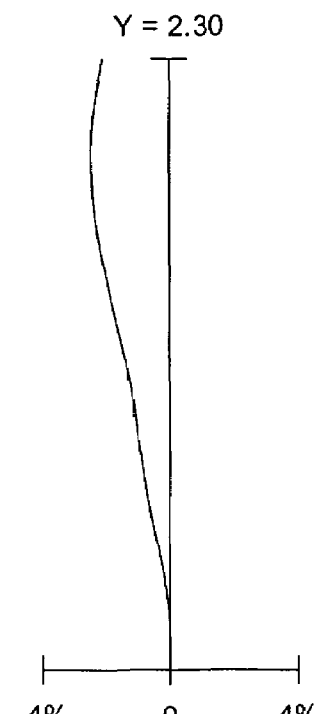
Figure 8C:
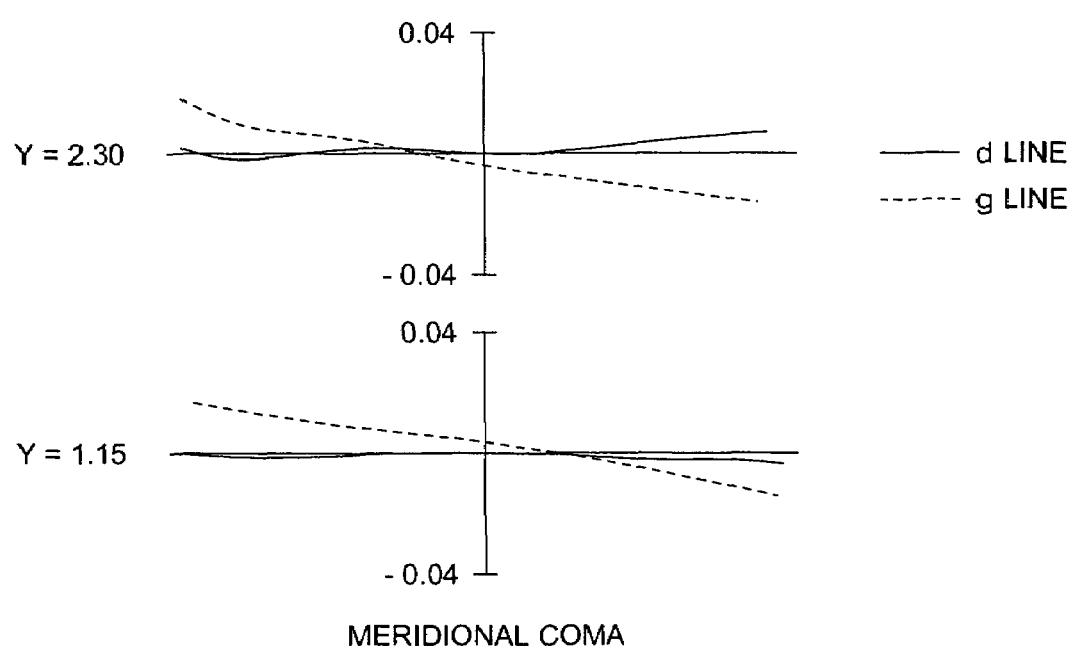

FIG. 7 is an explanatory view showing an image pick-up lens arrangement of Example 2. In the view, L1 is the first lens, L2 is the second lens, L3 is the third lens, and S shows an aperture stop. FIGS. 8(a), 8(b) and 8(c) are aberration views (spherical aberration, astigmatism, distortion aberration, meridional coma) of Example 2.

EXAMPLE 3

The image pick-up lens data is shown in Tables 7, 8, and numerical values corresponding to each conditional expression are shown in Table 9.

TABLE 7

(Example 3)
f = 4.41 mm, fB = 1.27 mm, F = 2.88, 2Y = 5.41 mm

| Surface No. | R (mm) | D (mm) | Nd | vd |
|---|---|---|---|---|
| 1 | 2.109 | 1.15 | 1.53180 | 56.0 |
| 2 | 4.408 | 0.27 | | |
| Stop | ∞ | 0.76 | | |
| 3 | −1.876 | 1.35 | 1.53180 | 56.0 |
| 4 | −1.008 | 0.10 | | |
| 5 | 6.557 | 0.82 | 1.58300 | 30.0 |
| 6 | 1.644 | 0.38 | | |
| 7 | ∞ | 0.50 | 1.58300 | 30.0 |
| 8 | ∞ | | | |

TABLE 8

Aspheric surface coefficient

| | |
|---|---|
| The 1st surface | K = 9.97640 × $10^{-1}$ |
| | A4 = −2.39800 × $10^{-3}$ |
| | A6 = −1.11260 × $10^{-3}$ |
| | A8 = 7.91930 × $10^{-4}$ |
| | A10 = 4.51280 × $10^{-4}$ |
| | A12 = −5.11950 × $10^{-4}$ |
| The 2nd surface | K = 2.23320 × 10 |
| | A4 = −7.29240 × $10^{-3}$ |
| | A6 = 5.64450 × $10^{-2}$ |
| | A8 = −8.53860 × $10^{-2}$ |
| | A10 = 1.32870 × $10^{-3}$ |
| The 3rd surface | K = −3.74000 × $10^{-2}$ |
| | A4 = −1.14890 × $10^{-2}$ |
| | A6 = −1.28530 × $10^{-1}$ |
| | A8 = 1.50210 × $10^{-1}$ |
| | A10 = −2.76770 × $10^{-2}$ |
| The 4th surface | K = −2.62840 |
| | A4 = −1.37460 × $10^{-1}$ |
| | A6 = 5.85800 × $10^{-2}$ |
| | A8 = −2.98050 × $10^{-2}$ |
| | A10 = 7.71570 × $10^{-3}$ |
| | A12 = 1.80910 × $10^{-4}$ |
| The 5th surface | K = −1.00000 × $10^{2}$ |
| | A4 = −5.32430 × $10^{-2}$ |
| | A6 = 2.08950 × $10^{-2}$ |
| | A8 = −2.48990 × $10^{-3}$ |
| | A10 = −1.83750 × $10^{-4}$ |
| | A12 = 3.05100 × $10^{-5}$ |
| The 6th surface | K = −1.05810 × 10 |
| | A4 = −5.75510 × $10^{-2}$ |
| | A6 = 1.25510 × $10^{-2}$ |
| | A8 = −1.31700 × $10^{-3}$ |
| | A10 = 1.86700 × $10^{-5}$ |
| | A12 = −1.99490 × $10^{-7}$ |

TABLE 9

| | Example 3 |
|---|---|
| (1), (8) f1/f | 1.47 |
| (3), (9) f3/f | −0.91 |
| (2) {(v1 + v2)/2} − v3 | 26.0 |
| (4), (10) |R4|/f | 0.23 |
| (5), (11) X − X0 | h = hmax (2.4 mm) |
| | −0.8349 |
| | h = 0.7 × hmax |
| | −0.2564 |
| (7) L/2Y | 1.18 |

Figure 9:
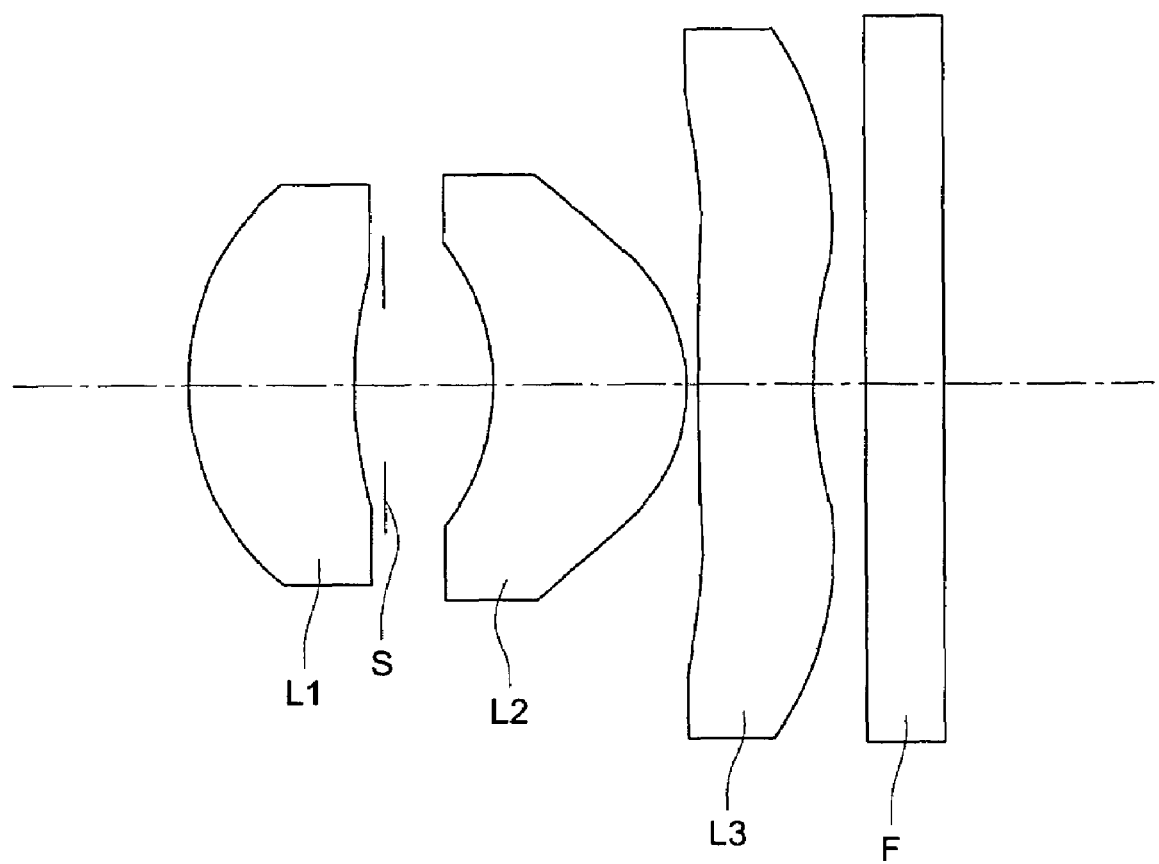
FIG. 9 is an explanatory view showing an image pick-up lens arrangement of example 3.
Figure 10:
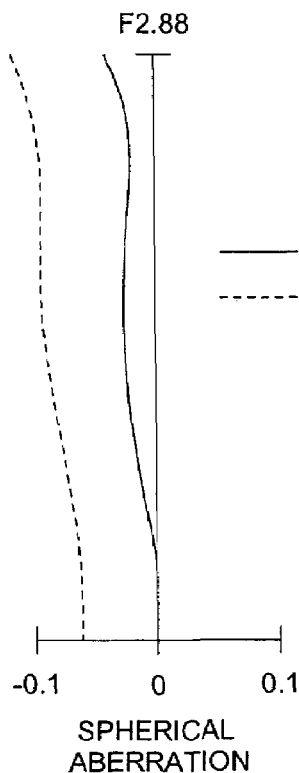
FIGS. 10(a), 10(b) and 10(c) are aberration views (spherical aberration, astigmatism, distortion aberration, meridional coma) of example 3.
Figure 10:
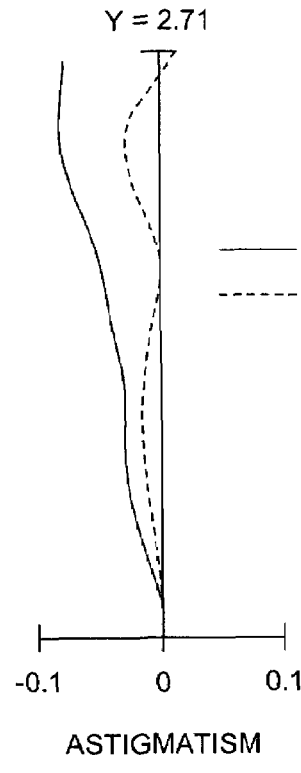
Figure 10:
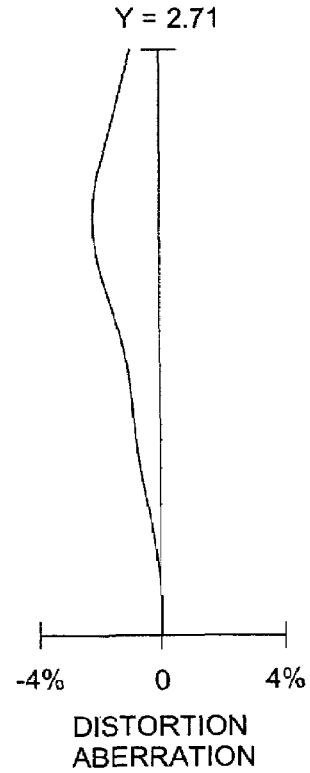
Figure 10:
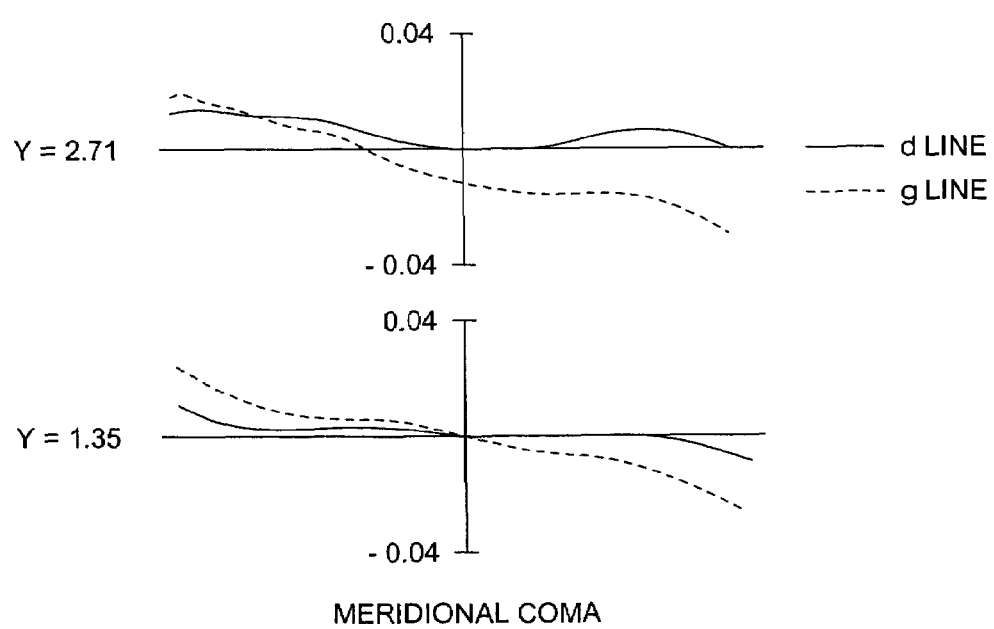

FIG. 9 is an explanatory view showing an image pick-up lens arrangement of Example 3. In the view, L1 is the first lens, L2 is the second lens, L3 is the third lens, and S shows an aperture stop. FIGS. 10(*a*), 10(*b*) and 10(*c*) are aberration views (spherical aberration, astigmatism, distortion aberration, meridional coma) of Example 3.

EXAMPLE 4

The image pick-up lens data is shown in Tables 10, 11, and numerical values corresponding to each conditional expression are shown in Table 12.

TABLE 10

(Example 4)
f = 5.42 mm, fB = 1.00 mm, F = 2.88, 2Y = 6.60 mm

| Surface No. | R (mm) | D (mm) | Nd | vd |
|---|---|---|---|---|
| 1 | 2.432 | 1.25 | 1.58913 | 61.2 |
| 2 | 4.926 | 0.52 | | |
| Stop | ∞ | 0.75 | | |
| 3 | −2.249 | 2.00 | 1.53180 | 56.0 |
| 4 | −1.234 | 0.10 | | |
| 5 | 7.304 | 0.85 | 1.60700 | 27.0 |
| 6 | 1.966 | 0.74 | | |
| 7 | ∞ | 0.30 | 1.51633 | 64.1 |
| 8 | ∞ | 0.20 | | |
| 9 | ∞ | 0.30 | 1.51633 | 64.1 |
| 10 | ∞ | | | |

TABLE 11

| Aspheric surface coefficient | |
|---|---|
| The 1st surface | K = 6.73890 × 10$^{-1}$ |
| | A4 = −4.82010 × 10$^{-4}$ |
| | A6 = −1.19920 × 10$^{-4}$ |
| | A8 = 6.55890 × 10$^{-5}$ |
| | A10 = −3.26150 × 10$^{-5}$ |
| | A12 = 5.26560 × 10$^{-6}$ |
| The 2nd surface | K = 8.49190 |
| | A4 = 7.03830 × 10$^{-3}$ |
| | A6 = −4.86490 × 10$^{-3}$ |
| | A8 = 4.67580 × 10$^{-3}$ |
| | A10 = −1.05940 × 10$^{-3}$ |
| The 3rd surface | K = 2.23973 |
| | A4 = −3.23190 × 10$^{-3}$ |
| | A6 = −2.54490 × 10$^{-2}$ |
| | A8 = 1.18000 × 10$^{-2}$ |
| | A10 = 8.64290 × 10$^{-3}$ |
| The 4th surface | K = −3.13150 |
| | A4 = −7.73400 × 10$^{-2}$ |
| | A6 = 2.18640 × 10$^{-2}$ |
| | A8 = −7.04910 × 10$^{-3}$ |
| | A10 = 1.07200 × 10$^{-3}$ |
| | A12 = −4.71280 × 10$^{-5}$ |
| The 5th surface | K = 2.60826 |
| | A4 = −3.41440 × 10$^{-2}$ |
| | A6 = 5.86600 × 10$^{-3}$ |
| | A8 = −4.57760 × 10$^{-4}$ |
| | A10 = 1.24890 × 10$^{-5}$ |
| | A12 = −1.04620 × 10$^{-6}$ |
| The 6th surface | K = −9.48188 |
| | A4 = −2.38160 × 10$^{-2}$ |
| | A6 = 2.99130 × 10$^{-3}$ |
| | A8 = −2.44940 × 10$^{-4}$ |
| | A10 = 1.28500 × 10$^{-5}$ |
| | A12 = −6.97570 × 10$^{-7}$ |

TABLE 12

| | Example 4 |
|---|---|
| (1), (8) f1/f | 1.47 |
| (3), (9) f3/f | −0.91 |
| (2) {(v1 + v2)/2} − v3 | 31.6 |
| (4), (10) \|R4\|/f | 0.23 |
| (5), (11) X − X0 | h = hmax (2.9 mm) |
| | −0.8367 |
| | h = 0.7 × hmax |
| | −0.2539 |
| (7) L/2Y | 1.18 |

Figure 11:
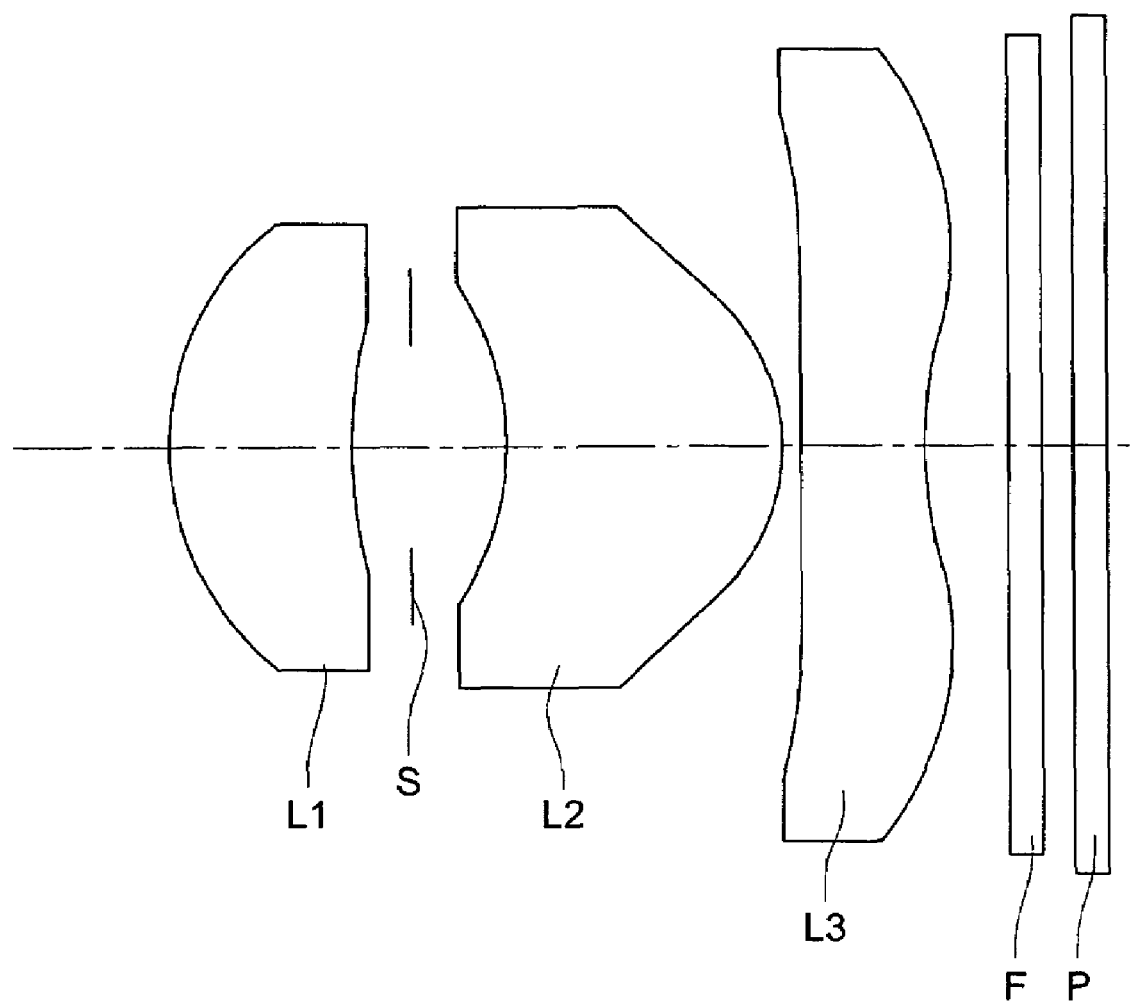
FIG. 11 is an explanatory view showing an image pick-up lens arrangement of example 4.
Figure 12:
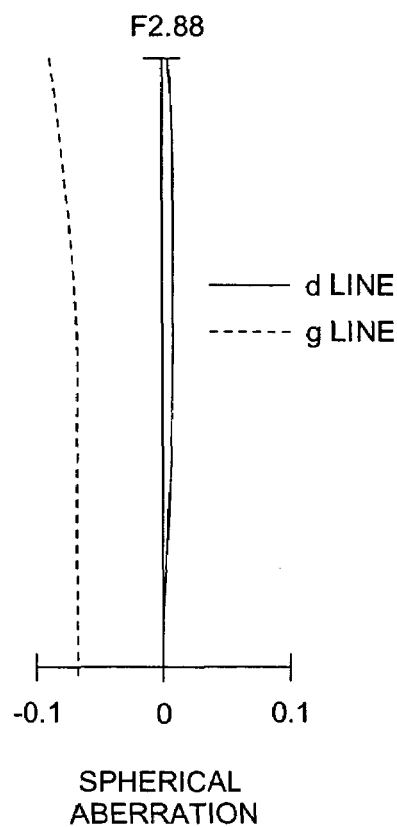
FIGS. 12(a), 12(b) and 12(c) are aberration views (spherical aberration, astigmatism, distortion aberration, meridional coma) of example 4.
Figure 12:
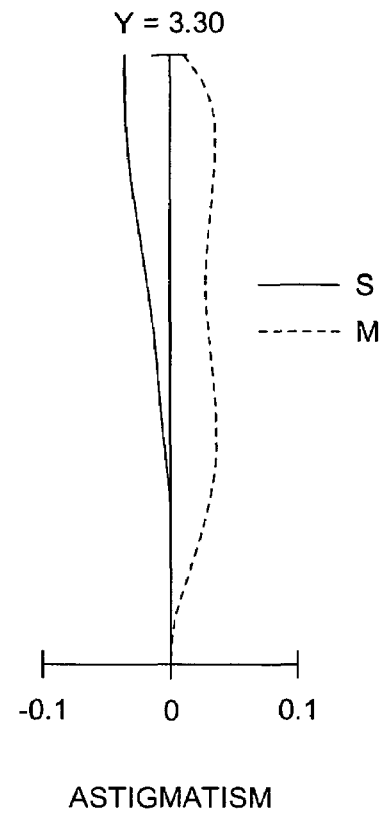
Figure 12:
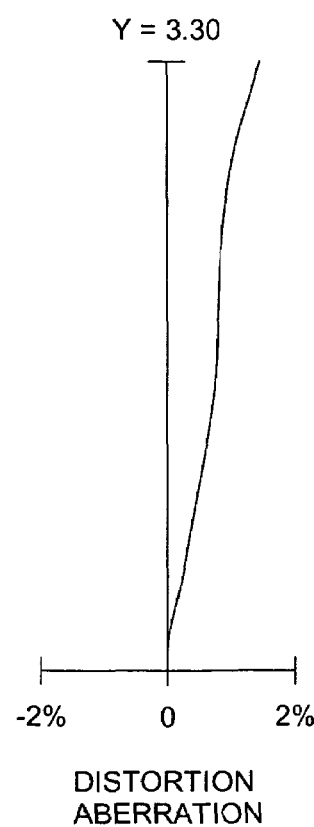
Figure 12:
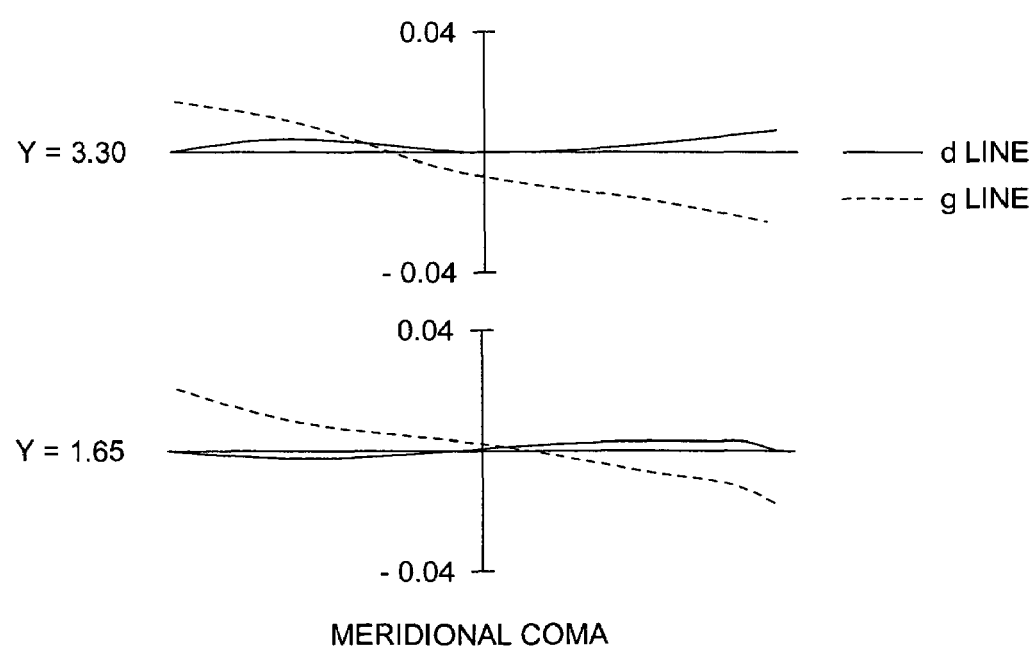

FIG. 11 is an explanatory view showing an image pick-up lens arrangement of Example 4. In the view, L1 is the first lens, L2 is the second lens, L3 is the third lens, and S shows an aperture stop. FIGS. 12(*a*), 12(*b*) and 12(*c*) are aberration views (spherical aberration, astigmatism, distortion aberration, meridional coma) of Example 4.

EXAMPLE 5

The image pick-up lens data is shown in Tables 13, 14, and numerical values corresponding to each conditional expression are shown in Table 15.

TABLE 13

(Example 5)
f = 5.40 mm, fB = 1.09 mm, F = 2.88, 2Y = 6.60 mm

| Surface No. | R (mm) | D (mm) | Nd | vd |
|---|---|---|---|---|
| 1 | 4.085 | 1.30 | 1.58913 | 61.2 |
| 2 | −40.780 | 0.40 | | |
| Stop | ∞ | 1.16 | | |
| 3 | −1.807 | 1.46 | 1.53180 | 56.0 |
| 4 | −1.144 | 0.10 | | |
| 5 | 7.351 | 0.85 | 1.58300 | 30.0 |
| 6 | 1.858 | 0.80 | | |
| 7 | ∞ | 0.30 | 1.51633 | 64.1 |
| 8 | ∞ | 0.20 | | |
| 9 | ∞ | 0.30 | 1.51633 | 64.1 |
| 10 | ∞ | | | |

TABLE 14

| Aspheric surface coefficient | |
|---|---|
| The 1st surface | K = 2.67530 × 10$^{-1}$ |
| | A4 = −4.63610 × 10$^{-3}$ |
| | A6 = −4.97610 × 10$^{-4}$ |
| | A8 = 2.65860 × 10$^{-5}$ |
| | A10 = −1.61090 × 10$^{-4}$ |
| | A12 = 2.00810 × 10$^{-5}$ |
| The 2nd surface | K = −4.87757 × 10 |
| | A4 = −8.77300 × 10$^{-3}$ |
| | A6 = 3.24540 × 10$^{-4}$ |
| | A8 = −1.29380 × 10$^{-3}$ |
| | A10 = 3.23650 × 10$^{-4}$ |
| The 3rd surface | K = 6.77720 × 10$^{-1}$ |
| | A4 = 2.57470 × 10$^{-4}$ |
| | A6 = −3.07290 × 10$^{-3}$ |
| | A8 = −2.49100 × 10$^{-3}$ |
| | A10 = 1.01490 × 10$^{-2}$ |
| The 4th surface | K = −3.00181 |
| | A4 = −8.57160 × 10$^{-2}$ |
| | A6 = 3.39170 × 10$^{-2}$ |
| | A8 = −1.62570 × 10$^{-2}$ |
| | A10 = 4.23280 × 10$^{-3}$ |
| | A12 = −3.38950 × 10$^{-4}$ |
| The 5th surface | K = −1.00000 × 10$^{-2}$ |
| | A4 = −3.39660 × 10$^{-3}$ |
| | A6 = −6.38250 × 10$^{-3}$ |
| | A8 = 2.08200 × 10$^{-3}$ |
| | A10 = −2.80690 × 10$^{-4}$ |
| | A12 = 9.11490 × 10$^{-6}$ |

TABLE 14-continued

Aspheric surface coefficient

| | |
|---|---|
| The 6th surface | K = −1.00205 × 10 |
| | A4 = −2.53420 × $10^{-2}$ |
| | A6 = 3.42060 × $10^{-3}$ |
| | A8 = −5.17880 × $10^{-4}$ |
| | A10 = 4.81430 × $10^{-5}$ |
| | A12 = −2.68770 × $10^{-6}$ |

TABLE 15

| | Example 5 |
|---|---|
| (1), (8) f1/f | 1.18 |
| (3), (9) f3/f | −0.84 |
| (2) {(ν1 + ν2)/2} − ν3 | 28.6 |
| (4), (10) \|R4\|/f | 0.21 |
| (5), (11) X − X0 | h = hmax (2.4 mm) |
| | −0.8964 |
| | h = 0.7 × hmax |
| | −0.2294 |
| (7) L/2Y | 1.18 |

Figure 13:
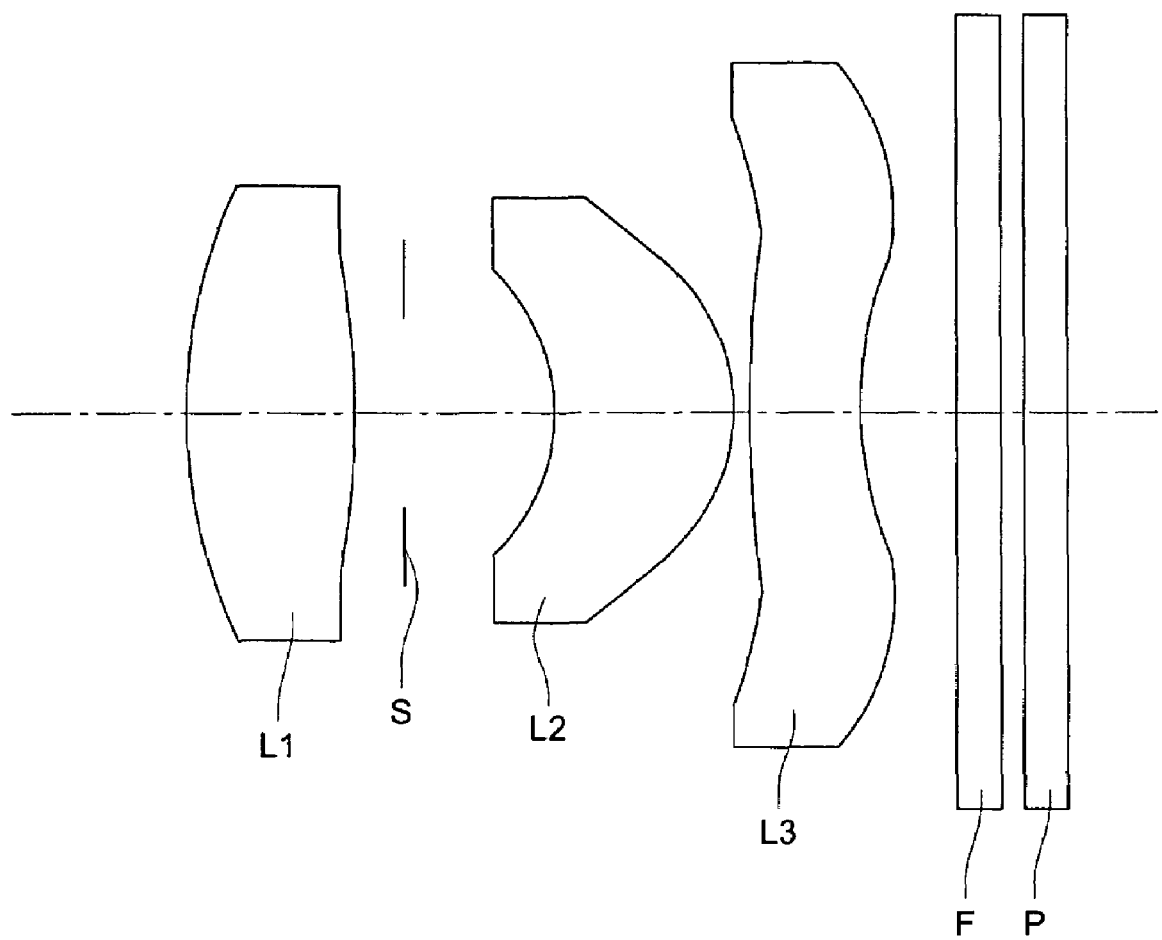
FIG. 13 is an explanatory view showing an image pick-up lens arrangement of example 5.
Figure 14:
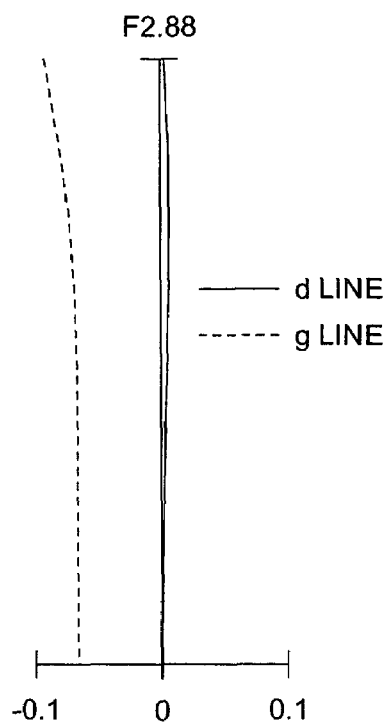
FIGS. 14(a), 14(b) and 14(c) are aberration views (spherical aberration, astigmatism, distortion aberration, meridional coma) of example 5.
Figure 14:
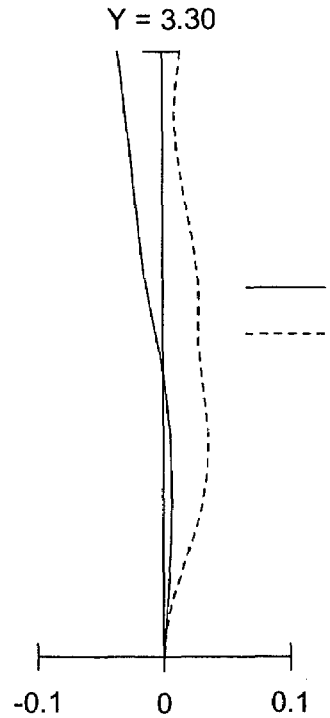
Figure 14:
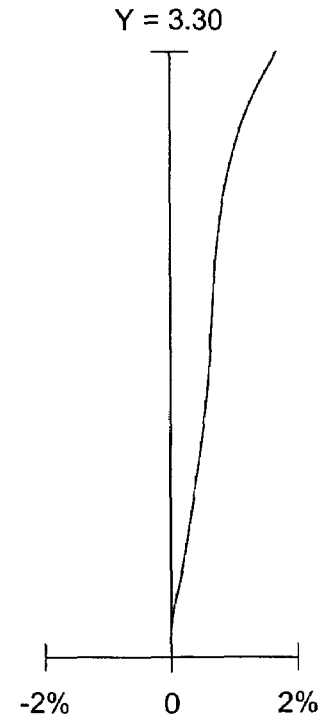
Figure 14:
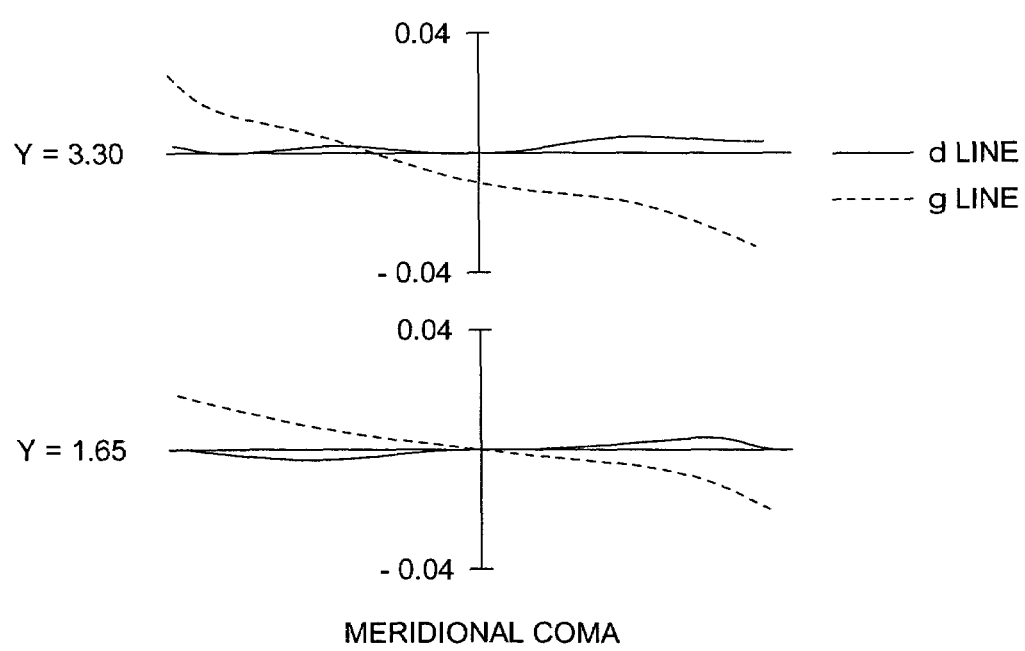

FIG. 13 is an explanatory view showing an image pick-up lens arrangement of Example 5. In the view, L1 is the first lens, L2 is the second lens, L3 is the third lens, and S shows an aperture stop. FIGS. 14(a), 14(b) and 14(c) are aberration views (spherical aberration, astigmatism, distortion aberration, meridional coma) of Example 5.

In the examples 1, 2 and 3, the first lens and the second lens are formed of polyorefine plastic material, and the saturation absorption coefficient is not larger than 0.01%. The third lens L3 is formed of a polycarbonate plastic material, and the saturation absorption coefficient is 0.4%.

Herein, because, in the plastic lens, the saturation absorption coefficient is lager than the glass lens, when abrupt humidity change occurs, the unequal distribution of the water absorption amount is transiently generated, and the refractive index does not become uniform, and there is a tendency that a good image formation performance can not be obtained. Therefore, for suppressing the performance deterioration due to the humidity change, it is preferable that the plastic material whose saturation water absorption is not larger than 0.7% is used.

In the above Example 4, the first lens L1 is formed of glass material. The second lens L2 is formed of polyorefine plastic material, and the saturation water absorption is not larger than 0.01%, and the third lens L3 is formed of polyester plastic material, and the saturation water absorption is 0.7%.

Further, in the above Example 5, the first lens L1 is formed of glass material. The second lens L2 is formed of the polyorefine plastic material, and the saturation water absorption is not larger than 0.01%, and the third lens L3 is formed of polycarbonate plastic material, and the saturation water absorption is 0.4%.

Further, because, in the plastic material, the refractive index change is large at the time of temperature change, in the case where all of first lens L1, second lens L2, and third lens L3 are structured by the plastic lenses, when the peripheral temperature changes, there is a problem that an image point position of the whole image pick-up lens system is varied. In the, image pick-up unit having the specification in which this image point position variation can not be neglected, for example, the positive first lens L1 is made a lens formed of the glass material (for example, glass mold lens), and the positive second lens L2 and the negative third lens L3 are formed of the plastic lenses, and when the refractive power allotment by which the image point position variation at the time of temperature change is cancelled out, is applied, this problem of the temperature characteristic can be lightened. When the glass mold lens is used, in order to prevent the wearing of the molding metallic die as small as possible, it is desirable that the glass material whose glass transition point (Tg) is not larger than 400° C. (400 centigrade) is used.

Further, recently, it becomes clear that the inorganic fine particles are mixed in the plastic material, and the temperature change of the refractive index of the plastic material can be suppressed small. When described in detail, generally, when fine particles are mixed in the transparent plastic material, because the scattering of the light is generated and the transmission factor is lowered, it is difficult to use as the optical material, however, when the size of the fine particle is made smaller than the wavelength of the transmission light flux, it can be realized so that the scattering is not practically generated. Although, in the plastic material, when the temperature rises, the refractive index is lowered, in the inorganic particles, when the temperature rises, the refractive index is increased. Accordingly, by using these temperature dependencies, by making them actuate so that they are cancelled out each other, it can be realized that the refractive index change is hardly generated. Specifically, when the inorganic particles whose maximum length is not larger than 20 nm, are dispersed in the plastic material as the base material, the plastic material whose temperature dependency of the refractive index is very low is formed. For example, when fine particles of niobium oxide ($Nb_2O_5$) are dispersed in acrylic resin, the refractive index change due to the temperature change can be made small.

In the present invention, when the plastic material in which such an inorganic particle is dispersed, is used for one of 2 positive lenses (L1, L2), or all of lenses (L1, L2, L3), the variation of the image point position at the time of temperature change of the whole image pick-up lens system can be suppressed small.

Further, the above examples 1, 2 are design example in which the optical low pass filter or infrared ray cut filter is not arranged on the image side of the image pick-up lens, however, the example 3 is a design example in which the infrared ray filter F in which the infrared cut coating is conducted on the object side surface, is arranged on image side of the image pick-up lens. Further, the example 4 and the example 5 are design examples in which the infrared ray cut filter F and a seal glass P of the solid-state imaging element package are arranged on the image side of the image pick-up lens. Of course, for each example, the optical low pass filter may be arranged at need.

Further, in the present example, as for the telecentric characteristic of the image side light flux, it is not always sufficient design. However, in the recent engineering, by re-consideration of the color filter of the solid-state imaging element or arrangement of micro lens array, the shading can be lightened, and when an angle formed between the chief ray of light and the optical axis is not larger than about 25° in the peripheral portion of the image pick-up surface, also the solid-state imaging element in which conspicuous shading is not generated, is developed. Accordingly, the present example is, as for a degree in which the requirement of the telecentric characteristic is soften, a design example in which a further size reduction is aimed.

What is claimed is:

1. An image pickup lens comprising in order from an object side of the image pickup lens:
   a first lens having positive refractive power whose convex surface faces the object side of the image pickup lens;
   an aperture stop;
   a meniscus-shaped second lens having positive refractive power whose convex surface faces an image side of the image pickup lens; and
   a third lens having negative refractive power whose concave surface faces the image side of the image pickup lens,
   wherein the image pickup lens satisfies the following conditional expressions:

$$0.8 < f1/f < 2.0 \quad (1)$$

$$20 < ((\nu1+\nu2)/2) - \nu3 < 70 \quad (2)$$

where f1 is a focal length of the first lens, f is a focal length of a total system of the image pickup lens, $\nu1$ is the Abbe constant of the first lens, $\nu2$ is the Abbe constant of the second lens, $\nu3$ is the Abbe constant of the third lens.

2. The image pickup lens of claim 1 which satisfies the following conditional expression:

$$-1.5 < f3/f < -0.5 \quad (3)$$

where f3 is a focal length of the third lens.

3. The image pickup lens of claim 1 which satisfies the following conditional expression:

$$0.15 < |R4|/f < 0.4 \quad (4)$$

where R4 is a curvature radius of an image side surface on the second lens.

4. The image pickup lens of claim 1,
   wherein the first lens has a meniscus shape whose convex surface faces the object side of the image pickup lens.

5. The image pickup lens of claim 1,
   wherein the third lens has a meniscus shape whose concave surface faces the image side of the image pickup lens.

6. The image pickup lens of claim 1, wherein an image side surface of the third lens satisfies the following conditional expression:

$$X - X0 < 0 \quad (5)$$

where X is an aspherical surface displacement which is given on X axis along an optical axis of the image pickup lens with an origin of the X axis placed at an apex of the image side surface of the third lens and satisfies the followings:

$$X = \frac{\frac{h^2}{R6}}{1 + \sqrt{1 - (1+K6)h^2/R6^2}} + \sum A_i h^i \quad (6)$$

X0 is a displacement of rotational quadric surface component of the aspherical surface which satisfies the followings:

$$X0 = \frac{\frac{h^2}{R6}}{1 + \sqrt{1 - (1+K6)h^2/R6^2}} \quad (7)$$

h is height along an arbitral direction perpendicular to the optical axis and satisfies hmax×0.7<h<hmax, hmax is the largest effective radius of the third lens,
   Ai is i-th order of an aspheric coefficient of the image side surface of the third lens,
   R6 is a curvature radius of the image side surface of the third lens, and
   K6 is a conic constant of the image side surface of the third lens.

7. The image pickup lens of claim 1, wherein the first lens, the second lens and the third lens are formed of plastic material.

8. The image pickup unit comprising:
   a solid-state imaging element having a photoelectric converting section;
   an image pickup lens of claim 1 for focusing an object image onto the photoelectric converting section of the solid-state imaging element;
   a substrate holding the solid-state imaging element and having an external output terminal for transmitting and receiving electric signals; and
   a housing comprising a light shielding member and having an opening for an incident light entering from the object side,
   which are formed in one united body,
   wherein height of the image pickup unit along an optical axis of the image pickup lens is 10 mm or lower.

9. A mobile terminal comprising the image pickup unit of claim 8.

10. An image pickup lens comprising in order from an object side of the image pickup lens:
    a first lens having positive refractive power whose convex surface faces the object side of the image pickup lens;
    an aperture stop;
    a meniscus shaped second lens having positive refractive power whose convex surface faces an image side of the image pickup lens; and
    a third lens having negative refractive power whose concave surface faces the image side of the image pickup lens,
    wherein the image pickup lens satisfies the following conditional expressions:

$$0.8 < f1/f < 2.0 \quad (8)$$

$$-1.5 < f3/f < -0.5 \quad (9)$$

where f1 is a focal length of the first lens, f is a focal length of a total system of the image pickup lens, and f3 is a focal length of the third lens.

11. The image pickup lens of claim 10 which satisfies the following conditional expression:

$$0.15 < |R4|/f < 0.4 \quad (10)$$

where R4 is a curvature radius of an image side surface on the second lens.

12. The image pickup lens of claim 10,
    wherein the first lens has a meniscus shape whose convex surface faces the object side of the image pickup lens.

13. The image pickup lens of claim 10,
    wherein the third lens has a meniscus shape whose concave surface faces the image side of the image pickup lens.

14. The image pickup lens of claim 10, wherein an image side surface of the third lens satisfies the following conditional expression:

$$X - X0 < 0 \quad (11)$$

where X is an aspherical surface displacement which is given on X axis along an optical axis of the image pickup lens with an origin of the X axis placed at an apex of the image side surface of the third lens and satisfies the followings:

$$X = \frac{\frac{h^2}{R6}}{1+\sqrt{1-(1+K6)h^2/R6^2}} + \sum A_i h^i \quad (12)$$

X0 is a displacement of rotational quadric surface component of the aspherical surface which satisfies the followings:

$$X0 = \frac{\frac{h^2}{R6}}{1+\sqrt{1-(1+K6)h^2/R6^2}} \quad (13)$$

h is height along an arbitral direction perpendicular to the optical axis and satisfies hmax×0.7<h<hmax, hmax is the largest effective radius of the third lens, Ai is i-th order of an aspheric coefficient of the image side surface of the third lens, R6 is a curvature radius of the image side surface of the third lens, and K6 is a conic constant of the image side surface of the third lens.

15. The image pickup lens of claim 10, wherein the first lens, the second lens and the third lens are formed of plastic material.

16. The image pickup unit comprising:
    a solid-state imaging element having a photoelectric converting section;
    an image pickup lens of claim 10 for focusing an object image onto the photoelectric converting section of the solid-state imaging element;
    a substrate holding the solid-state imaging element and having an external output terminal for transmitting and receiving electric signals; and
    a housing comprising a light shielding member and having an opening for an incident light entering from the object side,
    which are formed in one united body,
    wherein height of the image pickup unit along an optical axis of the image pickup lens is 10 mm or lower.

17. A mobile terminal comprising the image pickup unit of claim 16.

* * * * *